(12) United States Patent
Schork et al.

(10) Patent No.: US 8,704,639 B2
(45) Date of Patent: Apr. 22, 2014

(54) MANAGEMENT CONTROL OF HOUSEHOLD APPLIANCES USING RFID COMMUNICATION

(75) Inventors: Brian Michael Schork, Louisville, KY (US); John K. Besore, Prospect, KY (US); Natarajan Vankatakrishnan, Louisville, KY (US); Darko Ilickovic, Mount Washington, KY (US)

(73) Assignee: General Electric Company, Schenectady, NY (US)

( * ) Notice: Subject to any disclaimer, the term of this patent is extended or adjusted under 35 U.S.C. 154(b) by 778 days.

(21) Appl. No.: 12/559,528

(22) Filed: Sep. 15, 2009

(65) Prior Publication Data

US 2010/0090806 A1 Apr. 15, 2010

Related U.S. Application Data

(60) Provisional application No. 61/097,082, filed on Sep. 15, 2008.

(51) Int. Cl.
*H04Q 5/22* (2006.01)

(52) U.S. Cl.
USPC ............................. 340/10.1; 340/13.1

(58) Field of Classification Search
USPC ............... 340/10.1, 10.4, 10.5, 12.51, 13.26, 340/13.3; 700/295, 296
See application file for complete search history.

(56) References Cited

U.S. PATENT DOCUMENTS

| | | | |
|---|---|---|---|
| 2,545,054 | A | 3/1951 | Stitz |
| 3,683,343 | A | 8/1972 | Feldman et al. |
| 3,720,073 | A | 3/1973 | McCarty |
| 4,048,812 | A | 9/1977 | Thomason |
| 4,167,786 | A | 9/1979 | Miller et al. |
| 4,190,756 | A | 2/1980 | Foerstner |
| 4,216,658 | A | 8/1980 | Baker et al. |
| 4,247,786 | A | 1/1981 | Hedges |
| 4,362,970 | A | 12/1982 | Grady |
| 4,454,509 | A | 6/1984 | Buennagel et al. |
| 4,637,219 | A | 1/1987 | Grose |
| 4,659,943 | A | 4/1987 | Virant |

(Continued)

FOREIGN PATENT DOCUMENTS

| | | |
|---|---|---|
| CN | 1692317 A | 11/2005 |
| CN | 101013979 A | 8/2007 |

(Continued)

OTHER PUBLICATIONS

PCT Application No. PCT/US09/56911, Search Report, Mar. 10, 2010.

(Continued)

*Primary Examiner* — Edwin Holloway, III
(74) *Attorney, Agent, or Firm* — Global Patent Operation; Marc A. Vivenzio

(57) ABSTRACT

A method and system for communicating with an associated home appliance having a micro-controller includes providing a master device that emits a signal in response to data indicative of energy operational costs. One or more RFID tags receive the master device signal. The RFID tag(s) are connected to the associated home appliance micro-controller to control the operational mode of the home appliance. Preferably, four RFID tags are responsive to four distinct frequency signal emitted by the master device and are representative of different modes of operation for the associated home appliance.

13 Claims, 23 Drawing Sheets

SYSTEM DIAGRAM

(56) References Cited

U.S. PATENT DOCUMENTS

| | | | |
|---|---|---|---|
| 4,718,403 A | 1/1988 | McCall | |
| 4,731,547 A | 3/1988 | Alenduff et al. | |
| 4,903,502 A | 2/1990 | Hanson et al. | |
| 4,998,024 A | 3/1991 | Kirk et al. | |
| 5,040,724 A | 8/1991 | Brinkruff et al. | |
| 5,137,041 A | 8/1992 | Hall | |
| 5,183,998 A | 2/1993 | Hoffman et al. | |
| 5,220,807 A | 6/1993 | Bourne et al. | |
| 5,224,355 A | 7/1993 | So et al. | |
| 5,230,467 A | 7/1993 | Kubsch et al. | |
| 5,289,362 A | 2/1994 | Liebl et al. | |
| 5,408,578 A | 4/1995 | Bolivar | |
| 5,430,430 A | 7/1995 | Gilbert | |
| 5,451,843 A | 9/1995 | Kahn et al. | |
| 5,462,225 A | 10/1995 | Massara et al. | |
| 5,479,157 A | 12/1995 | Suman et al. | |
| 5,479,558 A | 12/1995 | White et al. | |
| 5,481,140 A | 1/1996 | Maruyama et al. | |
| 5,495,551 A | 2/1996 | Robinson et al. | |
| 5,504,306 A | 4/1996 | Russell et al. | |
| 5,505,377 A | 4/1996 | Weiss | |
| 5,515,692 A | 5/1996 | Sterber et al. | |
| 5,574,979 A | 11/1996 | West | |
| 5,581,132 A | 12/1996 | Chadwick | |
| 5,635,895 A | 6/1997 | Murr | |
| 5,706,191 A | 1/1998 | Bassett et al. | |
| 5,761,083 A | 6/1998 | Brown et al. | |
| 5,816,491 A | 10/1998 | Berkeley et al. | |
| 5,866,880 A | 2/1999 | Seitz et al. | |
| 5,874,902 A * | 2/1999 | Heinrich et al. | 340/10.51 |
| 5,880,536 A | 3/1999 | Mardirossian | |
| 5,883,802 A | 3/1999 | Harris | |
| 5,886,647 A | 3/1999 | Badger et al. | |
| 5,926,776 A | 7/1999 | Glorioso et al. | |
| 5,937,942 A | 8/1999 | Bias et al. | |
| 5,956,462 A | 9/1999 | Langford | |
| 6,018,150 A | 1/2000 | Maher | |
| 6,026,651 A | 2/2000 | Sandelman | |
| 6,080,971 A | 6/2000 | Seitz | |
| 6,118,099 A | 9/2000 | Lake | |
| 6,179,213 B1 | 1/2001 | Gibino et al. | |
| 6,185,483 B1 | 2/2001 | Drees | |
| 6,229,433 B1 | 5/2001 | Rye et al. | |
| 6,246,831 B1 | 6/2001 | Seitz et al. | |
| 6,380,866 B1 | 4/2002 | Sizer, II et al. | |
| 6,400,103 B1 | 6/2002 | Adamson | |
| 6,480,753 B1 | 11/2002 | Calder et al. | |
| 6,489,597 B1 | 12/2002 | Hornung | |
| 6,553,595 B1 | 4/2003 | Bruntz et al. | |
| 6,631,622 B1 | 10/2003 | Ghent et al. | |
| 6,694,753 B1 | 2/2004 | Lanz et al. | |
| 6,694,927 B1 | 2/2004 | Pouchak et al. | |
| 6,704,401 B2 | 3/2004 | Piepho et al. | |
| 6,778,868 B2 | 8/2004 | Imamura et al. | |
| 6,784,872 B1 | 8/2004 | Matsui et al. | |
| 6,806,446 B1 | 10/2004 | Neale | |
| 6,817,195 B2 | 11/2004 | Rafalovich et al. | |
| 6,828,695 B1 | 12/2004 | Hansen | |
| 6,860,431 B2 | 3/2005 | Jayadev | |
| 6,873,876 B1 | 3/2005 | Aisa | |
| 6,879,059 B2 | 4/2005 | Sleva | |
| 6,904,385 B1 | 6/2005 | Budike | |
| 6,922,598 B2 | 7/2005 | Lim et al. | |
| 6,943,321 B2 | 9/2005 | Carbone et al. | |
| 6,961,642 B2 | 11/2005 | Horst | |
| 6,983,210 B2 | 1/2006 | Matsubayashi et al. | |
| 7,010,363 B2 | 3/2006 | Donnelly et al. | |
| 7,039,575 B2 | 5/2006 | Juneau | |
| 7,043,380 B2 | 5/2006 | Rodenberg et al. | |
| 7,053,790 B2 | 5/2006 | Jang et al. | |
| 7,057,140 B2 | 6/2006 | Pittman | |
| 7,069,090 B2 | 6/2006 | Huffington et al. | |
| 7,082,380 B2 | 7/2006 | Wiebe et al. | |
| 7,110,832 B2 | 9/2006 | Ghent | |
| 7,155,305 B2 | 12/2006 | Hayes et al. | |
| 7,164,851 B2 | 1/2007 | Sturm et al. | |
| 7,206,670 B2 | 4/2007 | Pimputkar et al. | |
| 7,266,962 B2 | 9/2007 | Montuoro et al. | |
| 7,274,973 B2 | 9/2007 | Nichols et al. | |
| 7,274,975 B2 | 9/2007 | Miller et al. | |
| 7,368,686 B2 | 5/2008 | Etheredge et al. | |
| 7,372,002 B2 | 5/2008 | Nakamura et al. | |
| 7,420,140 B2 | 9/2008 | Lenhart et al. | |
| 7,420,293 B2 | 9/2008 | Donnelly et al. | |
| 7,446,646 B2 * | 11/2008 | Huomo | 340/10.1 |
| 7,478,070 B2 | 1/2009 | Fukui et al. | |
| 7,561,977 B2 | 7/2009 | Horst et al. | |
| 7,565,813 B2 | 7/2009 | Pouchak | |
| 7,685,849 B2 | 3/2010 | Worthington | |
| 7,720,035 B2 | 5/2010 | Oh et al. | |
| 7,751,339 B2 | 7/2010 | Melton et al. | |
| 7,783,390 B2 | 8/2010 | Miller | |
| 7,919,729 B2 | 4/2011 | Hsu | |
| 7,925,388 B2 | 4/2011 | Ying | |
| 7,962,248 B2 | 6/2011 | Flohr | |
| 7,991,513 B2 | 8/2011 | Pitt | |
| 8,024,073 B2 | 9/2011 | Imes et al. | |
| 8,027,752 B2 | 9/2011 | Castaldo et al. | |
| 8,033,686 B2 | 10/2011 | Recker et al. | |
| 8,094,037 B2 | 1/2012 | Unger | |
| 8,185,252 B2 | 5/2012 | Besore | |
| 8,190,302 B2 | 5/2012 | Burt et al. | |
| 8,355,748 B2 | 1/2013 | Abe et al. | |
| 8,367,984 B2 | 2/2013 | Besore et al. | |
| 2001/0025349 A1 | 9/2001 | Sharood et al. | |
| 2001/0048361 A1 * | 12/2001 | Mays et al. | 340/10.51 |
| 2002/0024332 A1 | 2/2002 | Gardner | |
| 2002/0071689 A1 | 6/2002 | Miyamoto | |
| 2002/0125246 A1 | 9/2002 | Cho et al. | |
| 2002/0175806 A1 | 11/2002 | Marneweck et al. | |
| 2002/0196124 A1 | 12/2002 | Howard et al. | |
| 2002/0198629 A1 | 12/2002 | Ellis | |
| 2003/0036820 A1 | 2/2003 | Yellepeddy et al. | |
| 2003/0043845 A1 | 3/2003 | Lim et al. | |
| 2003/0178894 A1 | 9/2003 | Ghent | |
| 2003/0193405 A1 | 10/2003 | Hunt et al. | |
| 2003/0194979 A1 | 10/2003 | Richards et al. | |
| 2003/0233201 A1 * | 12/2003 | Horst et al. | 702/62 |
| 2004/0024483 A1 | 2/2004 | Holcombe | |
| 2004/0034484 A1 | 2/2004 | Solomita et al. | |
| 2004/0098171 A1 * | 5/2004 | Horst | 700/295 |
| 2004/0100199 A1 | 5/2004 | Yang | |
| 2004/0107510 A1 | 6/2004 | Buckroyd et al. | |
| 2004/0112070 A1 | 6/2004 | Schanin | |
| 2004/0117330 A1 | 6/2004 | Ehlers et al. | |
| 2004/0118008 A1 | 6/2004 | Jeong et al. | |
| 2004/0128266 A1 | 7/2004 | Yellepeddy et al. | |
| 2004/0133314 A1 | 7/2004 | Ehlers et al. | |
| 2004/0139038 A1 | 7/2004 | Ehlers et al. | |
| 2004/0254654 A1 | 12/2004 | Donnelly et al. | |
| 2005/0011205 A1 | 1/2005 | Holmes et al. | |
| 2005/0134469 A1 | 6/2005 | Odorcic et al. | |
| 2005/0138929 A1 | 6/2005 | Enis et al. | |
| 2005/0173401 A1 | 8/2005 | Bakanowski et al. | |
| 2005/0184046 A1 | 8/2005 | Sterling | |
| 2005/0190074 A1 | 9/2005 | Cumeralto et al. | |
| 2006/0031180 A1 | 2/2006 | Tamarkin et al. | |
| 2006/0036338 A1 | 2/2006 | Harkcom et al. | |
| 2006/0068728 A1 | 3/2006 | Ishidoshiro et al. | |
| 2006/0095164 A1 | 5/2006 | Donnelly et al. | |
| 2006/0123807 A1 | 6/2006 | Sullivan et al. | |
| 2006/0159043 A1 | 7/2006 | Delp et al. | |
| 2006/0190139 A1 | 8/2006 | Reaume et al. | |
| 2006/0208570 A1 | 9/2006 | Christian et al. | |
| 2006/0272830 A1 | 12/2006 | Fima et al. | |
| 2006/0276938 A1 | 12/2006 | Miller | |
| 2006/0289436 A1 | 12/2006 | Carbone et al. | |
| 2007/0005195 A1 | 1/2007 | Pasquale et al. | |
| 2007/0008076 A1 | 1/2007 | Rodgers et al. | |
| 2007/0030116 A1 | 2/2007 | Feher | |
| 2007/0043478 A1 | 2/2007 | Ehlers et al. | |
| 2007/0136217 A1 | 6/2007 | Johnson et al. | |
| 2007/0151311 A1 | 7/2007 | McAllister et al. | |
| 2007/0185675 A1 | 8/2007 | Papamichael et al. | |

(56) References Cited

U.S. PATENT DOCUMENTS

| | | |
|---|---|---|
| 2007/0203860 A1 | 8/2007 | Golden et al. |
| 2007/0213880 A1 | 9/2007 | Ehlers |
| 2007/0220907 A1 | 9/2007 | Ehlers |
| 2007/0229236 A1* | 10/2007 | Mercer et al. ............... 340/425.5 |
| 2007/0271006 A1 | 11/2007 | Golden et al. |
| 2007/0276547 A1 | 11/2007 | Miller |
| 2008/0029081 A1 | 2/2008 | Gagas et al. |
| 2008/0034768 A1 | 2/2008 | Pimentel et al. |
| 2008/0083729 A1 | 4/2008 | Etheredge et al. |
| 2008/0106147 A1 | 5/2008 | Caggiano et al. |
| 2008/0120790 A1 | 5/2008 | Ashrafzadeh et al. |
| 2008/0122585 A1 | 5/2008 | Castaldo et al. |
| 2008/0136581 A1 | 6/2008 | Heilman et al. |
| 2008/0144550 A1 | 6/2008 | Makhlouf et al. |
| 2008/0167756 A1 | 7/2008 | Golden et al. |
| 2008/0167931 A1 | 7/2008 | Gerstemeier et al. |
| 2008/0172312 A1 | 7/2008 | Synesiou et al. |
| 2008/0177678 A1 | 7/2008 | Di Martini et al. |
| 2008/0179052 A1 | 7/2008 | Kates |
| 2008/0204240 A1* | 8/2008 | Hilgers et al. ............. 340/572.1 |
| 2008/0215263 A1 | 9/2008 | Flohr |
| 2008/0258633 A1 | 10/2008 | Voysey |
| 2008/0272934 A1 | 11/2008 | Wang et al. |
| 2008/0277487 A1 | 11/2008 | Mueller et al. |
| 2009/0006878 A1 | 1/2009 | Borghetti et al. |
| 2009/0038369 A1 | 2/2009 | Vondras |
| 2009/0063257 A1 | 3/2009 | Zak et al. |
| 2009/0105888 A1 | 4/2009 | Flohr et al. |
| 2009/0146838 A1 | 6/2009 | Katz |
| 2009/0171862 A1 | 7/2009 | Harrod et al. |
| 2009/0235675 A1 | 9/2009 | Chang et al. |
| 2009/0240381 A1 | 9/2009 | Lane |
| 2009/0326728 A1 | 12/2009 | Chrisop et al. |
| 2010/0017242 A1 | 1/2010 | Hamilton et al. |
| 2010/0070091 A1 | 3/2010 | Watson et al. |
| 2010/0092625 A1 | 4/2010 | Finch et al. |
| 2010/0131117 A1 | 5/2010 | Mattiocco et al. |
| 2010/0175719 A1 | 7/2010 | Finch et al. |
| 2010/0179708 A1 | 7/2010 | Watson et al. |
| 2010/0262963 A1 | 10/2010 | Wassermann et al. |
| 2010/0301774 A1 | 12/2010 | Chemel et al. |
| 2011/0001438 A1 | 1/2011 | Chemel et al. |
| 2011/0062142 A1 | 3/2011 | Steurer |
| 2011/0085287 A1 | 4/2011 | Ebrom et al. |
| 2011/0087382 A1 | 4/2011 | Santacatterina et al. |
| 2011/0095017 A1 | 4/2011 | Steurer |
| 2011/0106328 A1 | 5/2011 | Zhou et al. |
| 2011/0114627 A1 | 5/2011 | Burt |
| 2011/0123179 A1 | 5/2011 | Roetker et al. |
| 2011/0148390 A1 | 6/2011 | Burt et al. |
| 2011/0153106 A1 | 6/2011 | Drake et al. |
| 2011/0181114 A1 | 7/2011 | Hodges et al. |
| 2011/0290781 A1 | 12/2011 | Burt et al. |
| 2012/0054123 A1 | 3/2012 | Broniak et al. |

FOREIGN PATENT DOCUMENTS

| | | |
|---|---|---|
| EP | 1496324 A1 | 1/2005 |
| GB | 2105127 A | 3/1983 |
| JP | 11313441 A2 | 11/1999 |
| KR | 20060085711 A | 7/2006 |
| WO | 86/00976 A1 | 2/1986 |
| WO | 90/12261 A1 | 10/1990 |
| WO | 98/48335 A1 | 10/1998 |
| WO | 2007/060059 A1 | 5/2007 |
| WO | 2007136456 A2 | 11/2007 |

OTHER PUBLICATIONS

Weisstein, Eric W. "At Least One.", From MathWorld—A Wolfram Web Resource. http://mathworld.wolfram.com/AtLeastOne.html, p. 1.

International Search Report from PCT Application No. PCT/US2009/056878, Nov. 17, 2009.

International Search Report from PCT Application No. PCT/US2009/056882, Nov. 4, 2009.

International Search Report from PCT Application No. PCT/US2009/056883, Oct. 26, 2009.

International Search Report from PCT Application No. PCT/US2009/056886, Nov. 5, 2009.

International Search Report from PCT Application No. PCT/US2009/056889, Nov. 10, 2009.

International Search Report from PCT Application No. PCT/US2009/056894, Nov. 13, 2009.

International Search Report from PCT Application No. PCT/US2009/056895, Nov. 9, 2009.

International Search Report from PCT Application No. PCT/US2009/056906, Nov. 10, 2009.

International Search Report from PCT Application No. PCT/US2009/056913, Nov. 10, 2009.

International Search Report from PCT Application No. PCT/US2009/056914, Nov. 2, 2009.

International Search Report from PCT Application No. PCT/US2009/056919, Nov. 2, 2009.

Search Report from EP Application No. 10153695.1, May 24, 2012.

Real-Time Feedback, Natural Resources Canada via website www.nrcan.gc.ca , 2008, http://oee.nrcan.gc.ca/publications/equipment/10918.

Lemay et al., An Integrated Architecture for Demand Response Communications and Control, University of Illinois Urbana-Champaign, Oct. 28, 2008.

International Search Report from PCT Application No. PCT/US2009/056901, Nov. 10, 2009.

Search Report from CN Application No. 201010135268.8 dated Oct. 24, 2012.

* cited by examiner

LOCAL STORAGE COULD ALSO BE USED FOR DEMAND CONTROL.
LOCAL GENERATION COULD BE USED FOR LOCAL CONSUMPTION,
STORAGE, OR SALE BASED ON NEEDS AND TIME OF DAY
FOR MOST EFFECTIVE FINANCIAL RETURN.

| | | | | |
|---|---|---|---|---|
| REFRIGERATOR | REFR UI RESPONSE (DSM DISABLED) | DURING OPERATION | NORMAL DISPLAY | |
| | REFR UI RESPONSE (DSM ENABLED) | DURING OPERATION | DISPLAY "ECO RATE LOW-NORMAL OPERATION" | |
| WASHER | DRYER UI RESPONSE (DSM DISABLED) | PRIOR TO OPERATION | NORMAL DISPLAY | |
| | DRYER UI RESPONSE (DSM DISABLED) | DURING OPERATION | NORMAL DISPLAY | |
| | WASHER UI RESPONSE (DSM ENABLED) | PRIOR TO OPERATION | NORMAL DISPLAY | |
| | WASHER UI RESPONSE (DSM ENABLED) | DURING OPERATION | NORMAL DISPLAY | |
| DRYER | DRYER UI RESPONSE (DSM DISABLED) | PRIOR TO OPERATION | NORMAL DISPLAY | |
| | DRYER UI RESPONSE (DSM DISABLED) | DURING OPERATION | NORMAL DISPLAY | |
| | DRYER UI RESPONSE (DSM ENABLED) | PRIOR TO OPERATION | NORMAL DISPLAY | MATCH TO FIG. 9B |
| | DRYER UI RESPONSE (DSM ENABLED) | DURING OPERATION | NORMAL DISPLAY | |
| RANGE | RANGE UI RESPONSE (DSM DISABLED OR NORMAL) | PRIOR TO OPERATION | NORMAL DISPLAY | |
| | | DURING OPERATION | NORMAL DISPLAY | |
| | RANGE UI RESPONSE (DSM ENABLED) | PRIOR TO OPERATION | NORMAL DISPLAY | |
| | | DURING OPERATION | NORMAL DISPLAY | |
| DISHWASHER | DISHWASHER UI RESPONSE (DSM DISABLED OR NORMAL) | PRIOR TO OPERATION | NORMAL DISPLAY | |
| | | DURING OPERATION | NORMAL DISPLAY | |
| | DISHWASHER UI RESPONSE (DSM ENABLED) | PRIOR TO OPERATION | NORMAL DISPLAY | |
| | | DURING OPERATION | NORMAL DISPLAY | |
| MWO | DISHWASHER UI RESPONSE (DSM DISABLED OR NORMAL) | PRIOR TO OPERATION | NORMAL DISPLAY | |
| | | DURING OPERATION | NORMAL DISPLAY | |
| | DISHWASHER UI RESPONSE (DSM ENABLED) | PRIOR TO OPERATION | NORMAL DISPLAY | |
| | | DURING OPERATION | NORMAL DISPLAY | |

*Fig. 9A*

| MEDIUM | HIGH | CRITICAL |
|---|---|---|
| NORMAL DISPLAY | NORMAL DISPLAY | NORMAL DISPLAY |
| DISPLAY "ECO RATE MEDIUM-NORMAL OPERATION" | DISPLAY "ECO RATE HIGH - FEATURES DELAYED" | DISPLAY "ECO RATE CRITICAL - FEATURES DELAYED" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| DISPLAY "ECO" | DISPLAY "ECO" | DISPLAY "ECO" |
| DISPLAY "ECO" | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |

MATCH TO FIG. 9A

Fig. 9B

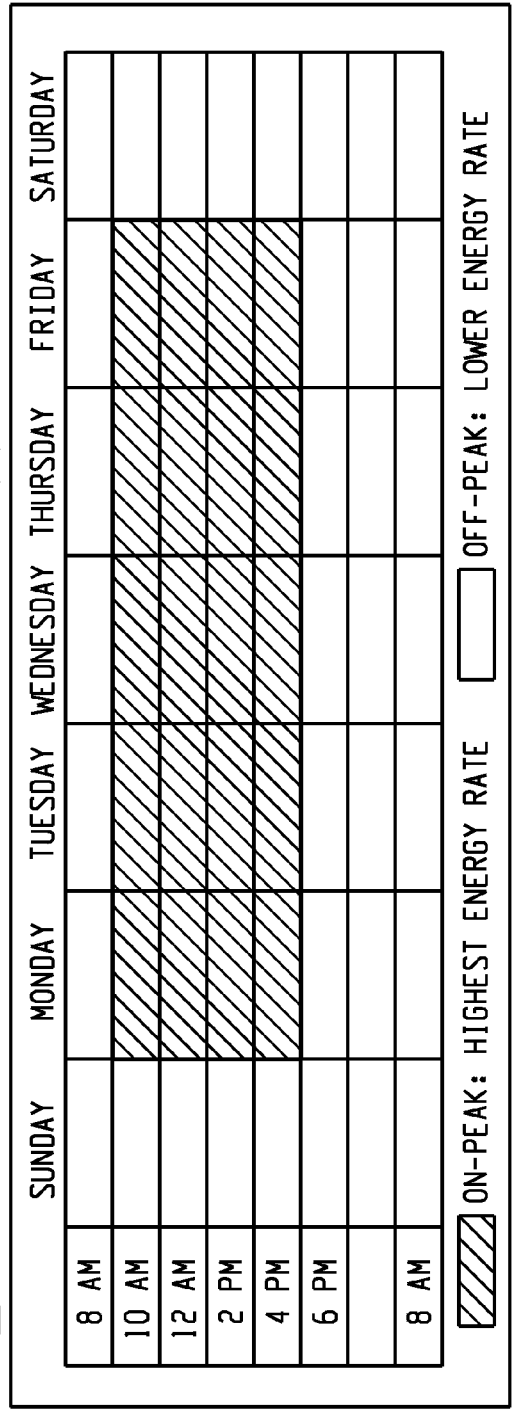

ELECTRIC POWER UTILITY - TIME OF USE - AS APPLIED TO REFRIGERATION

BACKGROUND

TIME-OF-USE IS A VOLUNTARY ELECTRIC UTILITY PROGRAM WHICH ALLOWS A CONSUMER TO PURCHASE LOWER PRICED ELECTRIC POWER BY USING POWER WHEN THE "GRID" ELECTRIC DEMAND IS LESS. THE TIME-OF-USE SCHEDULE IS GENERALLY WORKED OUT WITH THE REGIONAL POWER COMPANY AND LEGISLATORS AND THE SCHEDULE IS WELL KNOWN AND EASILY OBTAINED BY THE CONSUMER.

PARTS OF THE SYSTEM

SYSTEM IMPLEMENTATION HAS THREE UNIQUE CATEGORIES AND ARE LISTED BELOW:

(1) METHOD OF INPUTING THE TIME-OF-USE SCHEDULE (A) CONSUMER ZIP CODE ENTRY - REQUIRES A DATABASE MANAGED BY GE AND UPGRADEABLE (B) TIME VERSUS DAY OF THE WEEK PEAK DEMAND SCHEDULE WITH USER INPUT - REQUIRES INITIAL INPUT BY CONSUMER AND DATABASE MANAGED BY USER WHEN CHANGES HAPPEN (2) ELECTRONIC CIRCUIT CHANGES REQUIRED - CIRCUITRY THAT KEEPS TIME WILL BE REQUIRED AND SOFTWARE TO INTERACT WITH THE TIME-OF-USE SCHEDULE INPUT AND ACTIONS WOULD BE REQUIRED (A) ONE METHOD WOULD BE A ZERO CROSS (B) ANOTHER METHOD WOULD BE A CLOCK CALENDAR IC WITH CAPACITOR OR BATTERY BACKUP (3) A LIST OF ACTIONS THAT COULD BE PERFORMED AT TIMES WHEN THE ELECTRIC RATES ARE OFF PEAK (A) DELAY DEFROST UNTIL OFF PEAK (B) PRECHILL WHEN NEARING PEAK DEMAND TO KEEP THE COMPRESSOR USAGE AT A MINIMUM DURING PEAK DEMAND (C) ALERT USER WHEN PEAK DEMAND IS ON WHEN THE DOORS ARE OPENED (LIGHT ELECTRIC DRAW) OR WHEN THE ICE DISPENSER IS USED DURING PEAK DEMAND

*Fig. 11*

A LIST OF ACTIONS THAT COULD BE PERFORMED AT TIMES WHEN THE ELECTRIC RATES ARE OFF PEAK

> DELAY DEFROST UNTIL OFF PEAK

> PRECHILL WHEN NEARING PEAK DEMAND TO KEEP THE COMPRESSOR USAGE AT A MINIMUM DURING PEAK DEMAND

> ALERT USER WHEN PEAK DEMAND IS ON - OCCURS WHEN THE DOOR WAS OPENED OR ICE CRUSHER USED, ETC.

*Fig. 20*

TITLE: APPLIANCE ACTIONS AND RESPONSE - DEMAND SIDE MANAGEMENT FOR HOME APPLIANCES
ABSTRACT: THE INVENTION(S) ARE THE APPLIANCE ACTIONS AND RESPONSES TO ELECTRIC UTILITY SIGNALS PROVIDED IN CONJUNCTION WITH A DEMAND SIDE MANAGEMENT (DSM) SYSTEM. THIS IS PART OF THE ADVANCED METERING INFRASTRUCTURE (AMI) INITIATIVE WHICH PROVIDES REMOTE METERING FUNCTIONS SUCH AS REMOTE METER READING, DEMAND SIGNALING/LOAD CONTROL, ETC.. THE ATTACHED DOCUMENT DESCRIBES IN BRIEF DETAIL ACTIONS AND RESPONSES TO DSM SIGNALING.

UPON RECEIVING A HIGH PRICE ENERGY SIGNAL THE USER MAY SET THE UNIT TO:

a) DELAY ALL SPECIAL MODES UNTIL THE LOW PRICED ENERGY SIGNAL IS RECEIVED. MODE EXAMPLES ARE:
  i. ICE MAKER
  ii. BEVERAGE CENTER
  iii. TURBO COOL
  iv. CUSTOM COOL
  v. QUICK ICE b) OVERRIDE THE HIGH PRICED ENERGY SIGNAL, ALWAYS OR BASED ON A CERTAIN $/Kwh LEVEL
c) DELAY DEFROST UNTIL PEFORMANCE IS WOULD BE AFFECTED
d) ANNOUNCE OR AUDIBLE ALERT OF THE "HIGH PRICED ENERGY SIGNAL" DURING A CYCLE
e) VISUALLY ALERT USER OF THE "HIGH PRICED ENERGY" SIGNAL
f) DISPLAY THE COST OF RUNNING THE UNIT IN THE SELECTED MODE OF OPERATION
g) DISPLAY THE COST OF ENERGY AT THE PRESENT TIME
h) DISABLE LIGHTING
i) TURN OFF SWEAT HEATERS

*Fig. 21*

MANAGEMENT CONTROL OF HOUSEHOLD APPLIANCES USING RFID COMMUNICATION

The present application claims priority from U.S. Provisional Patent Application Ser. No. 61/097,082 filed 15 Sep. 2008, now Ser. No. 12/559,703, filed 15 Sep. 2009; which provisional patent application is expressly incorporated herein by reference, in its entirety. In addition, cross-reference is made to commonly owned, copending application Ser. No. 12/559,636, filed 15 Sep. 2009; Ser. No. 12/559,539, filed 15 Sep. 2009; Ser. No. 12/559,654, filed 15 Sep. 2009; Ser. No. 12/559,581; filed 15 Sep. 2009; Ser. No. 12/559,550, filed 15 Sep. 2009; Ser. No. 12/559,597; filed 15 Sep. 2009; Ser. No. 12/559,705, filed 15 Sep. 2009; Ser. No. 12/559,561, filed 15 Sep. 2009; Ser. No. 12/559,577, filed 15 Sep. 2009; Ser. No. 12/559,751, filed 15 Sep. 2009; and Ser. No. 12/559,684, filed 15 Sep. 2009.

BACKGROUND

This disclosure relates to energy management, and more particularly to energy management of household consumer appliances. The disclosure finds particular application to changing existing appliances via add-on features or modules, and incorporating new energy saving features and functions into new appliances. More particularly, this disclosure relates to a method of communicating data between a master device and one or more slave devices using radio-frequency identification (RFID).

Currently utilities charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened.

One proposed third party solution is to provide a system where a controller "switches" the actual energy supply to the appliance or control unit on and off. However, there is no active control beyond the mere on/off switching. It is believed that others in the industry cease some operations in a refrigerator during on-peak time.

For example, in a refrigerator most energy is consumed to keep average freezer compartment temperature at a constant level. Recommended temperature level is based on bacteria multiplication. Normally recommended freezer temperature for long (1-2 month) food storage is 0 degrees F. Research shows that bacteria rise is a linear function of the compartment temperature, i.e., the lower the temperature the lower the bacteria multiplication. Refrigerator designers now use this knowledge to prechill a freezer compartment (and in less degree a refrigerator compartment also) before defrost, thus keeping an average temperature during time interval that includes before, during, and after defrost at approximately the same level (for example, 0 degrees F.).

There are also currently different methods used to determine when variable electricity-pricing schemes go into effect. There are phone lines, schedules, and wireless signals sent by the electrical company. One difficulty is that no peak shaving method for an appliance such as a refrigerator will provide a maximal benefit. Further, different electrical companies use different methods of communicating periods of high electrical demand to their consumers. Other electrical companies simply have rate schedules for different times of day.

Electrical utilities moving to an Advanced Metering Infrastructure (AMI) system will need to communicate to appliances, HVAC, water heaters, etc. in a home or office building. All electrical utility companies (more than 3,000 in the US) will not be using the same communication method to signal in the AMI system. Similarly, known systems do not communicate directly with the appliance using a variety of communication methods and protocols, nor is a modular and standard method created for communication devices to interface and to communicate operational modes to the main controller of the appliance. Although conventional WiFi/ZigBee/PLC communication solutions are becoming commonplace, this disclosure introduces numerous additional lower cost, reliable solutions to trigger "load shedding" responses in appliances or other users of power. This system may also utilize the commonplace solutions as parts of the communication protocols.

BRIEF DESCRIPTION OF THE DISCLOSURE

The present disclosure reduces power consumption during on-peak hours by reducing the energy demand on the power generation facility, and also enabling the user/consumer to pay less to operate the appliance on an annual basis.

This disclosure is a low-cost alternative to using expensive or complicated methods of determining when peak electrical rates apply. For example, when the refrigerator is in peak shaving mode (or it could be programmed to do this constantly), an ambient light sensor determines when it is morning, and then stays in energy-saving mode for a predetermined number of hours. Preferably, the system will need a counter to know that the room has been dark for a predetermined number of hours. When the lights come on for a certain length of time, then the system knows, for example, that it is morning.

This disclosure provides a peak-shaving appliance such as a refrigerator, including a method to determine when to go into peak-shaving mode without using additional components, or components that have another purpose, and provides a high percentage of the maximum benefit for negligible cost. The two components needed for this are an ambient light sensor and a timer. The kitchen will be dark for an extended period of time while everyone is sleeping. The light sensor and the timer will be used to determine that it is nighttime and morning can be determined by the light sensor. When the refrigerator determines it is morning, the timer will be used to initiate peak shaving mode after some delay time. For example, peak shaving mode could start three hours after it is determined morning starts. Similarly, the ambient light sensor can also be used for dimming the refrigerator lights. This disclosure advantageously uses ambient light to determine when to start peak shaving.

An appliance interface can be provided for all appliances leaving the module to communicate with the AMI system. The system provides for appliance sales with a Demand Side Management capable appliance. The Demand Side Management Module (DSMM) is provided to control the energy consumption and control functions of an appliance using a communication method (including but not limited to PLC, FM, AM SSB, WiFi, ZigBee, Radio Broadcast Data System, 802.11, 802.15.4, etc.). The modular approach will enable an appliance to match electrical utility communication requirements. Each electrical utility region may have different communication methods, protocol methods, etc. This modular approach allows an appliance to be adapted to a particular geographical area of a consumer or a particular electrical provider. The module can be added as a follow on feature and applied after the appliance is installed. Typical installations could include an integral mounted module (inside the appliance or unit) or an externally mounted module (at the wall electrical receptacle or anywhere outside the appliance or unit). The module in this disclosure provides for 2 way communications if needed, and will provide for several states of operation—for example, 1) normal operation, 2) operation in low energy mode (but not off), and 3) operation in lowest energy mode.

This module could be powered from the appliance or via a separate power supply, or with rechargeable batteries. The rechargeable batteries could be set to charge under off-peak conditions. With the module powered from the appliance, the appliance could turn it off until the appliance needed to make a decision about power usage, eliminating the standby power draw of the module. If powered separately, the appliance could go to a low energy state or completely off, while the module continued to monitor rates.

Use of RFID tags in one proposed system should offer significant savings since the RFID tags have become very low cost due to the proliferation of these devices in retail and will effectively allow the enabled appliance to effectively communicate with the utility meter (e.g., receive signals from the utility meter). This system makes it very easy for a customer to manage energy usage during peak demand periods and lowers the inconvenience level to the customer by not shutting off appliances in the home by the utility. When local storage and local generation are integrated into the system, then cost savings are seen by the customer. This system also solves the issue of rolling brownouts/blackouts caused by excessive power demand by lowering the overall demand. Also, the system allows the customer to pre-program choices into the system that will ultimately lower utility demand as well as save the customer money in the customer's utility billing. For instance, the customer may choose to disable the defrost cycle of a refrigerator during peak rate timeframes. This disclosure provides for the controller to "communicate" with the internal appliance control board and command the appliance to execute specific actions with no curtailment in the energy supply. This disclosure further provides a method of communicating data between a master device and one or more slave devices using RFID technology. This can be a number of states or signals, either using one or more passive RFID tags that resonate at different frequencies resonated by the master, or one or more active RFID tags that can store data that can be manipulated by the master device and read by the slave device (s). The states in either the passive or active RFID tags can then be read by the microcontroller on the slave device(s) and appropriate functions/actions can be taken based upon these signals.

A system for controlling an associated home appliance (e.g., refrigerator, range, washer, dryer, water heater, dishwasher, microwave, air conditioner, etc.) includes a microcontroller operatively associated with each home appliance. A master device receives data relating to energy costs, for example, and emits a signal indicative of the data. At least one RFID tag is operatively associated with the microcontroller of the associated home appliance. The RFID tag receives the signal such that the microcontroller controls the operational mode of the associated home appliance in response to the emitted signal.

The RFID tag may be an active tag having a memory selectively altered in response to the signal emitted from the master device.

The RFID tag may be a passive tag and preferably plural passive RFID tags are associated with the microcontroller of an associated home appliance to provide different signals indicative of different energy savings operational modes.

The master device emits signals at different first, second, third, and fourth frequencies (for example) and a respective one of first, second, third, and fourth RFID tags is responsive to one of the four frequencies whereby the associated home appliance is actuated into a desired mode of operation.

The different modes of operation of an associated home appliance are directed to desired energy saving operational states.

Multiple associated home appliances may be provided in a home with each of the first RFID tags responsive to the first frequency signal from the master device, and the second frequency signal operatively communicates with each of the second RFID tags.

A method of communicating with an associated home appliance includes providing a master device that emits at least a first signal in response to data indicative of energy operational costs. The method further includes providing at least a first RFID tag that receives the master device signal and an associated home appliance micro-controller controls the operational mode of the home appliance.

The method further includes storing data within an active RFID tag memory and selectively manipulating the data in the active RFID tag by the master device.

The method includes the master device emitting signals at first and second different frequencies for communicating with at least first and second RFID tags, respectively.

The RFID tags are passive tags in another embodiment and resonate in response to a select frequency signal from the master device representative of different modes of operation for the associated home appliance.

Another exemplary embodiment uses continuous coded tones riding on carrier frequencies to transmit intelligence, for example, when one is merely passing rate information such as rate 1, 2, 3, or 4, using the tones to transmit the signals. One could further enhance the details of the messaging by assigning a binary number to a given tone, thus allowing one to "spell out" a message using binary coding with multiple tones. The appliance microcomputer would be programmed to respond to a given number that would arrive in binary format.

One advantage of this approach is that customers have complete control of their power. There have been proposals by utilities to shut off customers if they exceed demand limits or increase the number of rolling brownouts. This method also gives a customer finer granularity in their home in terms of control. A customer does not have to load shed a room just to manage a single device.

This disclosure also advantageously provides modes of load shedding in the appliance, lighting, or HVAC other than "on/off" to make the situation more acceptable from the perspective of the customer.

An advantage of the present disclosure is the ability to produce appliances with a common interface and let the module deal with the Demand Side Management.

Another advantage is the ability to control functions and features within the appliance and/or unit at various energy levels, i.e., as opposed to just an on/off function.

Another advantage is that the consumer can choose the module or choose not to have the module. If the module is chosen, it can be matched to the particular electrical utility service provider communication method of the consumer.

Another benefit is the increased flexibility with an associated electrical service provider, and the provision of several modes of operation (not simply an on/off mode). The module can be placed or positioned inside or outside the appliance and/or unit to provide demand side management.

Still other benefits relate to modularity, the ability to handle multiple communication methods and protocols without adversely impacting the cost of the appliance, opening up appliances to a variety of protocols, enabling demand side management or energy management, and/or providing for a standard interface to the appliance (for example, offering prechill and/or temperature set change during on-peak hours).

Low cost, reliable RF transmissions within the home, rather than using industrial solutions such as PLC or Zigbee solutions which are significantly more costly than the aforementioned system.

This disclosure provides a lower cost alternative to Wi-Fi/ZigBee/PLC communications solutions, and provides significant savings due to the low costs associated with RFID tags as a result of the proliferation of these devices in other commercial uses. Still other features and benefits of the present disclosure will become apparent from reading and understanding the following detailed description.

BRIEF DESCRIPTION OF THE DRAWINGS

FIGS. 1-8, 9A, 9B, and 10-21 illustrate various systems and method of exemplary embodiments described herein.

DETAILED DESCRIPTION OF THE PREFERRED EMBODIMENTS

Figure 1:
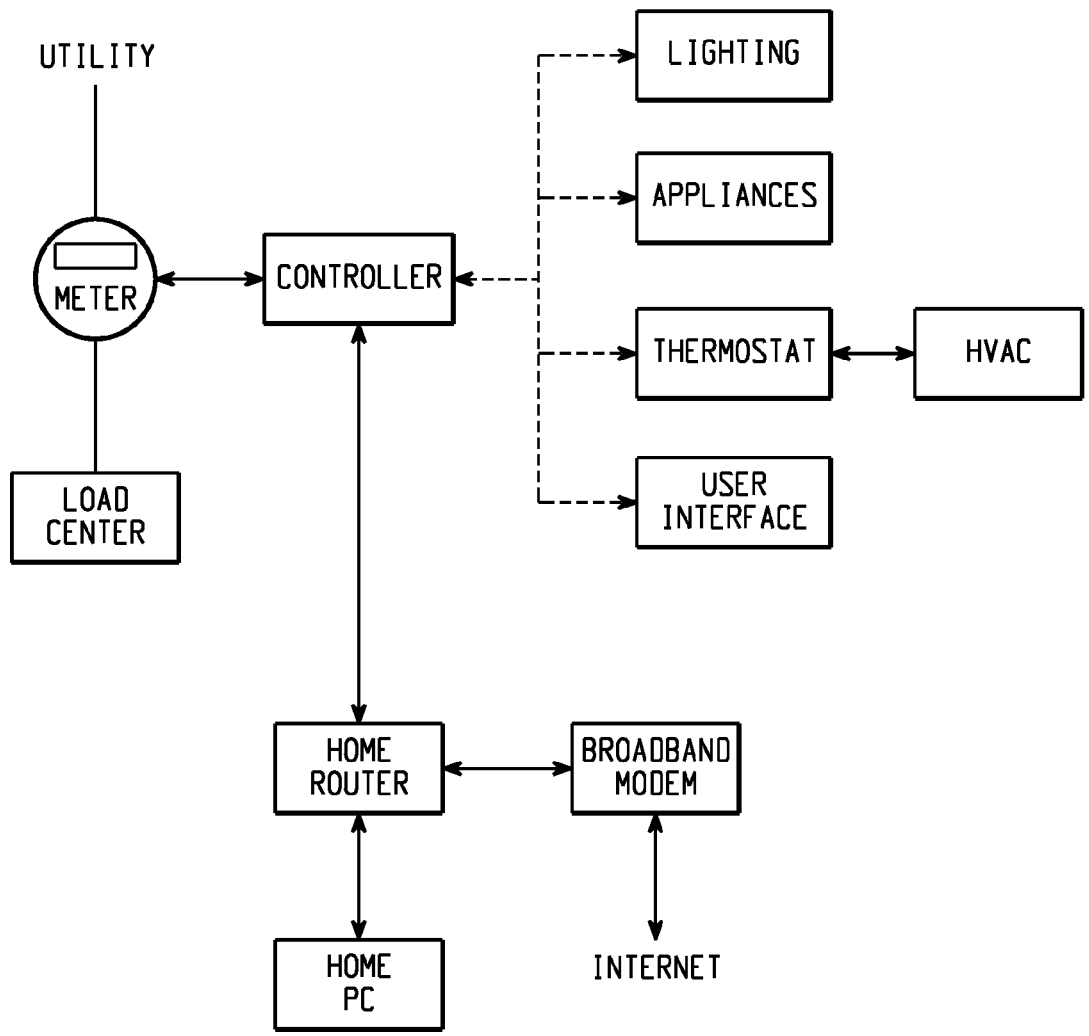
Figure 2:
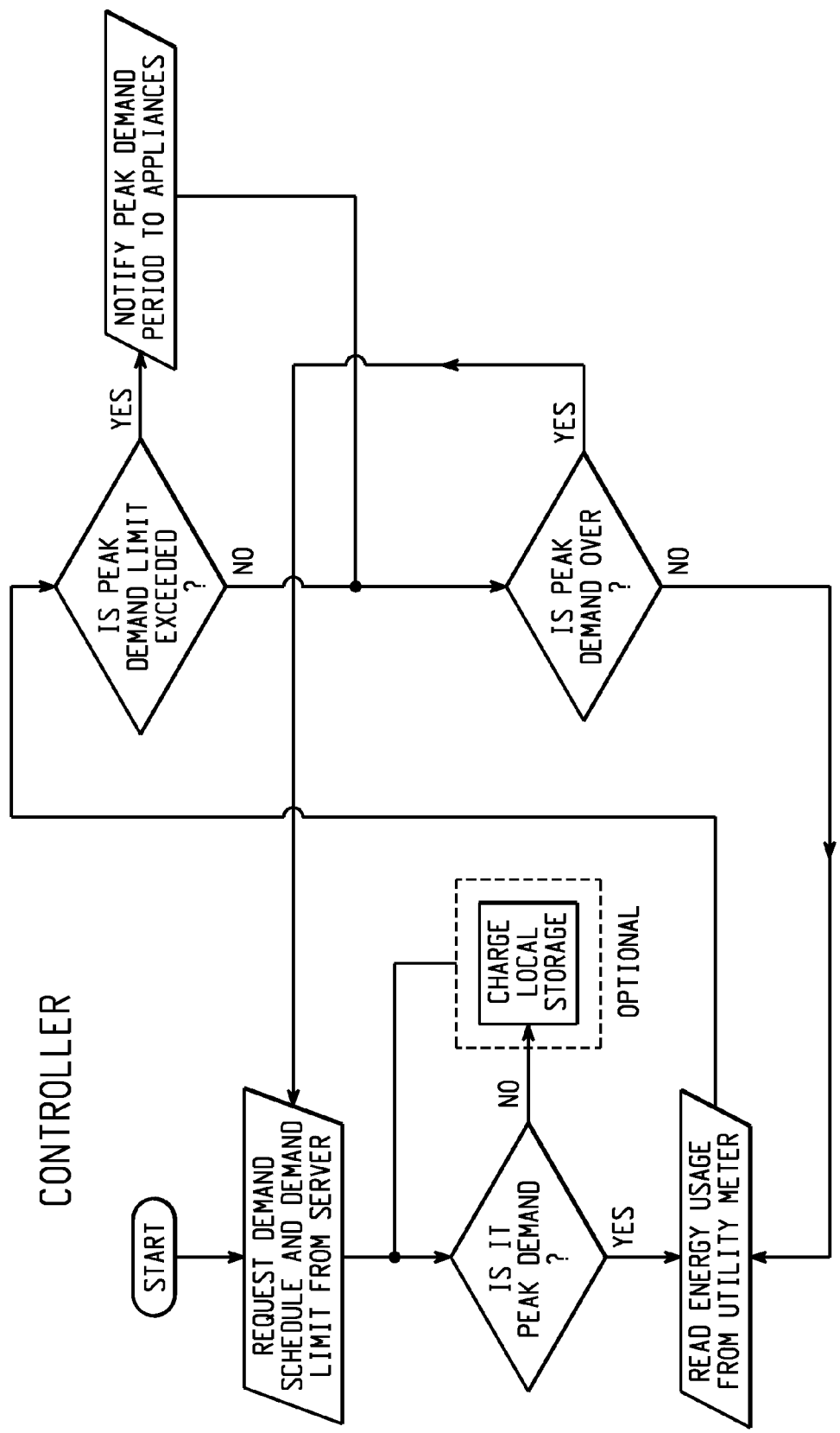

In one embodiment, a more advanced system is provided to handle energy management between the utility and the homeowner's appliances. The term "homeowner" is used herein to refer to the user of the appliances served by the utility, and should be understood to include renters, or commercial or institutional users of appliances or other utility customers that operate appliances. The system can include one or more of the following: a controller, utility meter, communication network, intelligent appliances, local storage, local generator and/or demand server. Less advanced systems may actually allow the appliance to "communicate directly with the utility meter or mesh network through the DSSM (Demand Side Management Module) (FIG. 1). The demand server is a computer system that notifies the controller when the utility is in peak demand and what is the utility's current demand limit. A utility meter can also provide the controller the occurrence of peak demand and demand limit. The demand limit can also be set by the home owner. Additionally, the homeowner can choose to force various modes in the appliance control based on the rate the utility is charging at different times of the day. The controller will look at the energy consumption currently used by the home via the utility meter and see if the home is exceeding the demand limit read from the server. If the demand limit is exceeded, the controller will notify the intelligent appliances, lighting and thermostat/HVAC (FIG. 2).

Figure 3:
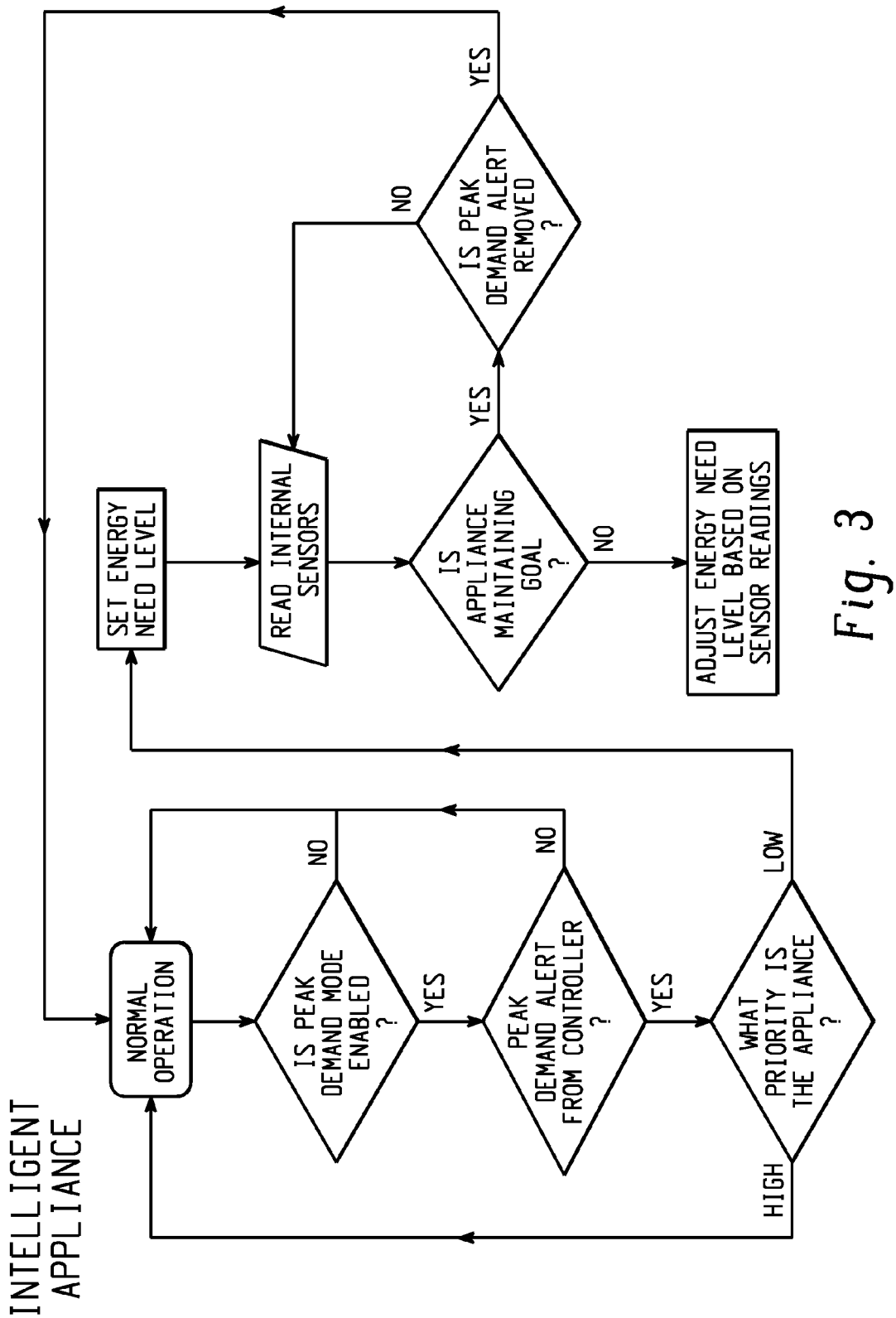

Each intelligent appliance has a communication interface that links itself to the controller (FIG. 3). This interface can be power-line carrier, wireless, and/or wired. The controller will interact with the appliance and lighting controls as well as thermostat (for HVAC) to execute the users preferences/settings.

Enabled appliances receive signals from the utility meter and help lower the peak load on the utility and lower the amount of energy that the consumer uses during high energy cost periods of the day. There are several ways to accomplish this, through wireless communication (ZigBee, WiFi, etc) or through PLC (power line carrier) communication. Alternatively, using passive RFID tags that resonate at different frequencies resonated by the master, or one or more active RFID tags that can store data that can be manipulated by the master device and read by the slave devices(s) is an effective and potentially lower cost communication solution since there is no protocol. Rather, a pulse of energy at a particular frequency will allow a low cost method with an open protocol for transmitting/communicating between a master device and one or more slave devices, and appropriate functions/actions can be taken based upon these signals.

Figure 4:
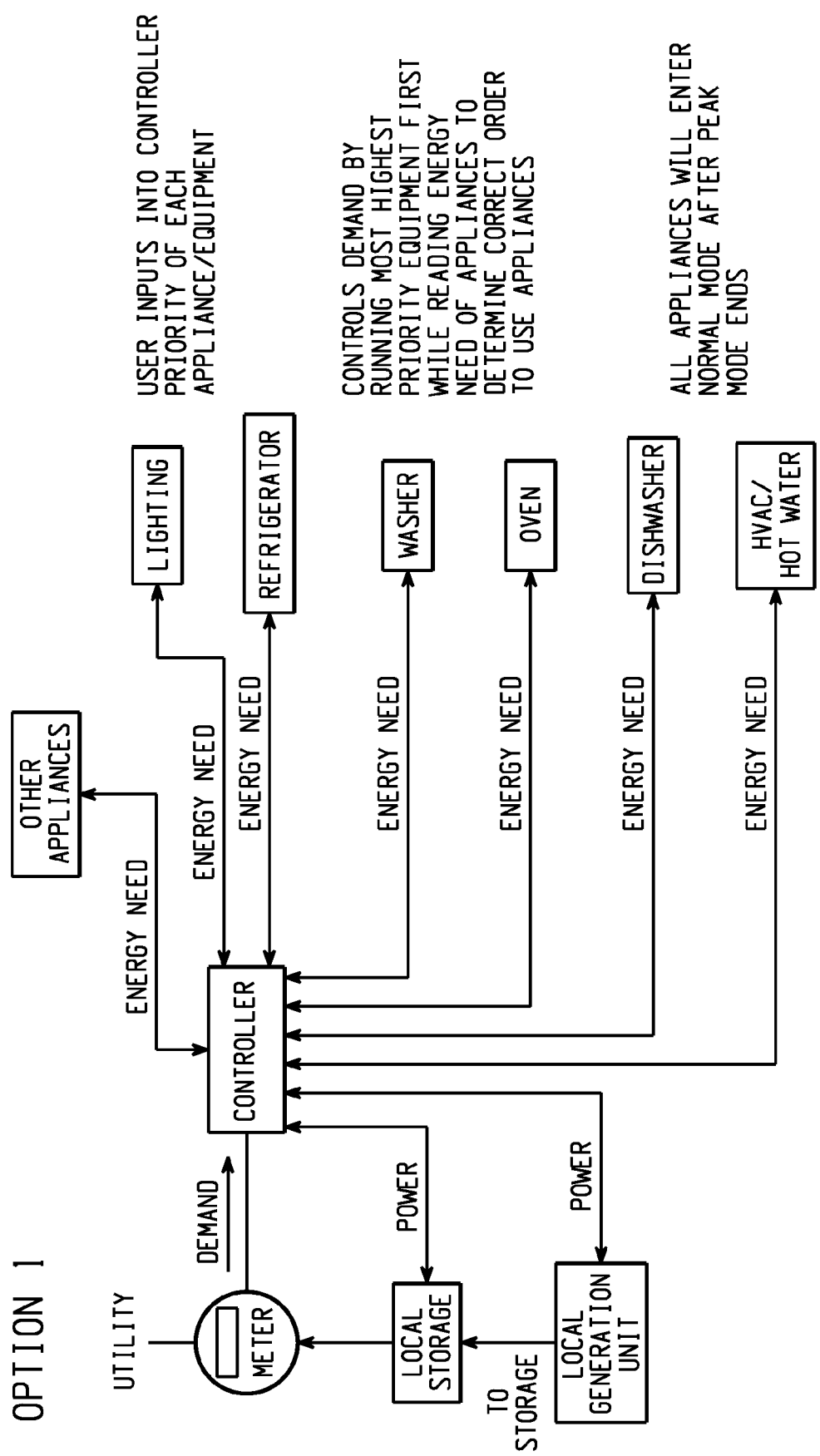

The interaction between controller and appliances can occur in two ways. For example, in one scenario during a peak demand period, the controller will receive a demand limit from the utility, demand server or user. The controller will then allocate the home's demand based on two factors: priority of the appliance and energy need level (FIG. 4). The priority dictates which appliances have higher priority to be in full or partial energy mode than other appliances. Energy need dictates how much energy is required for a certain time period in order for that appliance to function properly. If the appliance's energy need is too low to function properly, the appliance moves to a normal mode or a higher energy need level. The energy saving mode is typically a lower energy usage mode for the appliance such as shutdowns of compressors and motors, delayed cycles, higher operating temperatures in summer or lower operating temperatures in winter until the peak demand period is over. Once the demand limit is reached, the appliances will stay in their energy mode until peak demand is over, or a user overrides, or appliance finishes need cycle or priority changes. The controller constantly receives status updates from the appliances in order to determine which state they are in and in order to determine if priorities need to change to accomplish the system goals.

Figure 5:
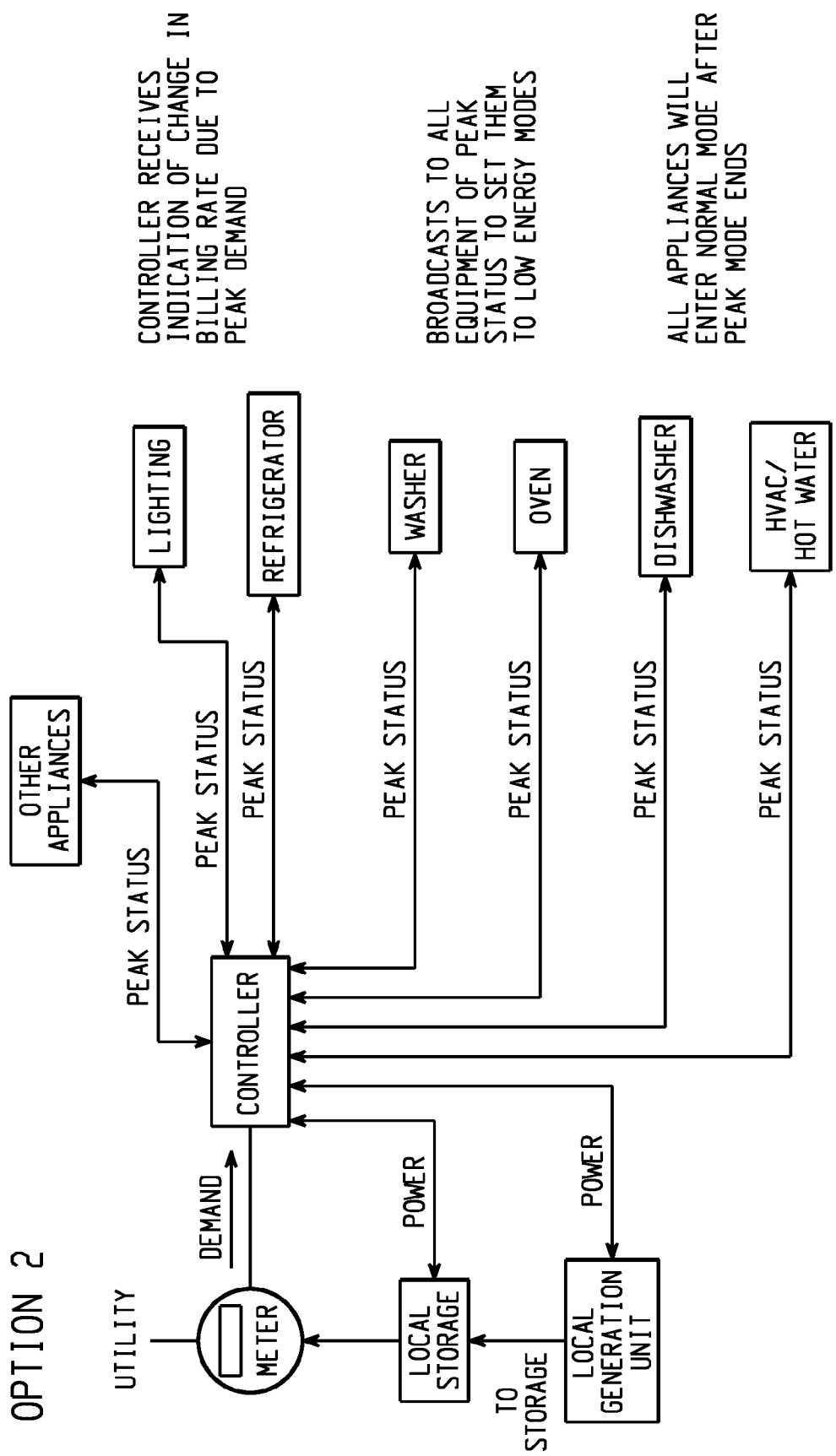

In a second scenario, for example, a set point is provided. During a peak demand period, the controller will tell each appliance to go into peak demand mode (FIG. 5). The appliance will then go into a lower energy mode. The customer can deactivate the energy savings mode by selecting a feature on the appliance front end controls (i.e. user interface board) before or during the appliance use or at the controller. The controller can also communicate to a local storage or power generation unit. This local unit is connected to the incoming power supply from the utility. The controller notifies the storage unit to charge when it is not in peak demand, if a storage unit is included and available. If the storage unit has enough energy to supply the appliances during peak demand, then the controller will switch the home's energy consumption from the utility to the storage unit. The unit can also be local generator/storage such as solar, hydrogen fuel cell, etc.

Figure 6:
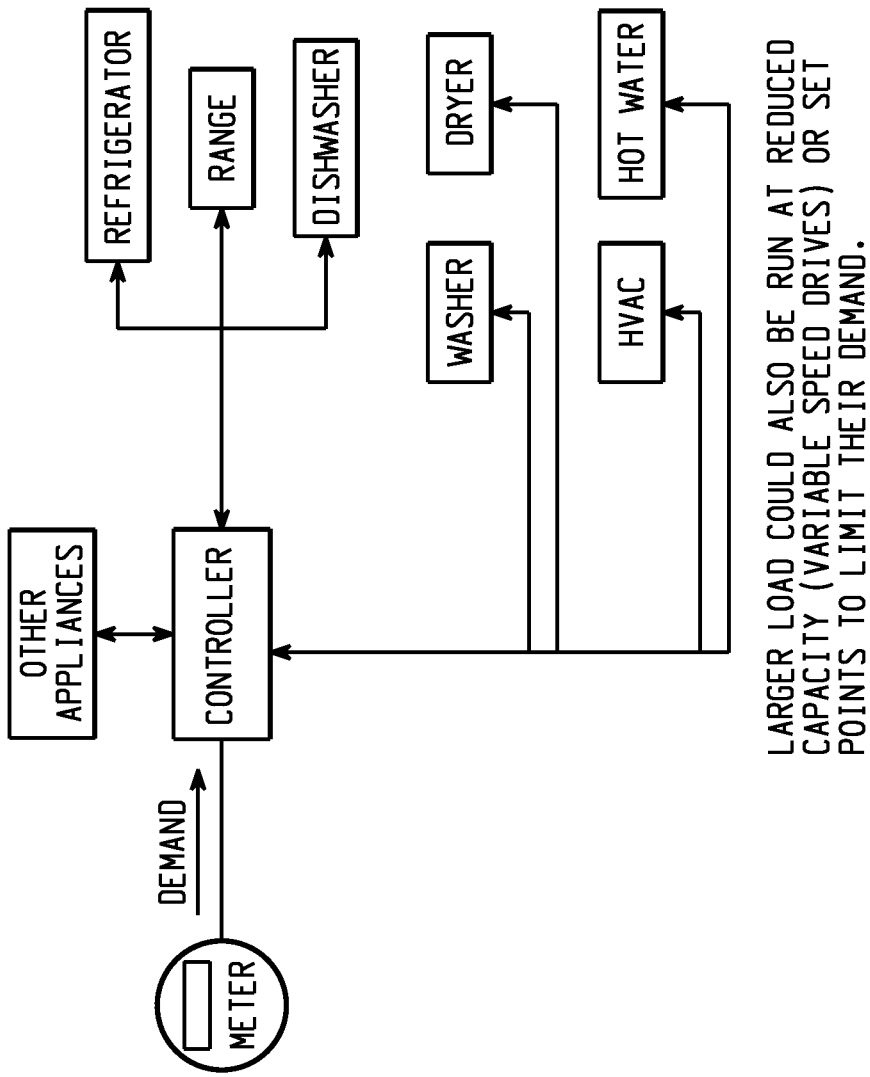
Figure 7:
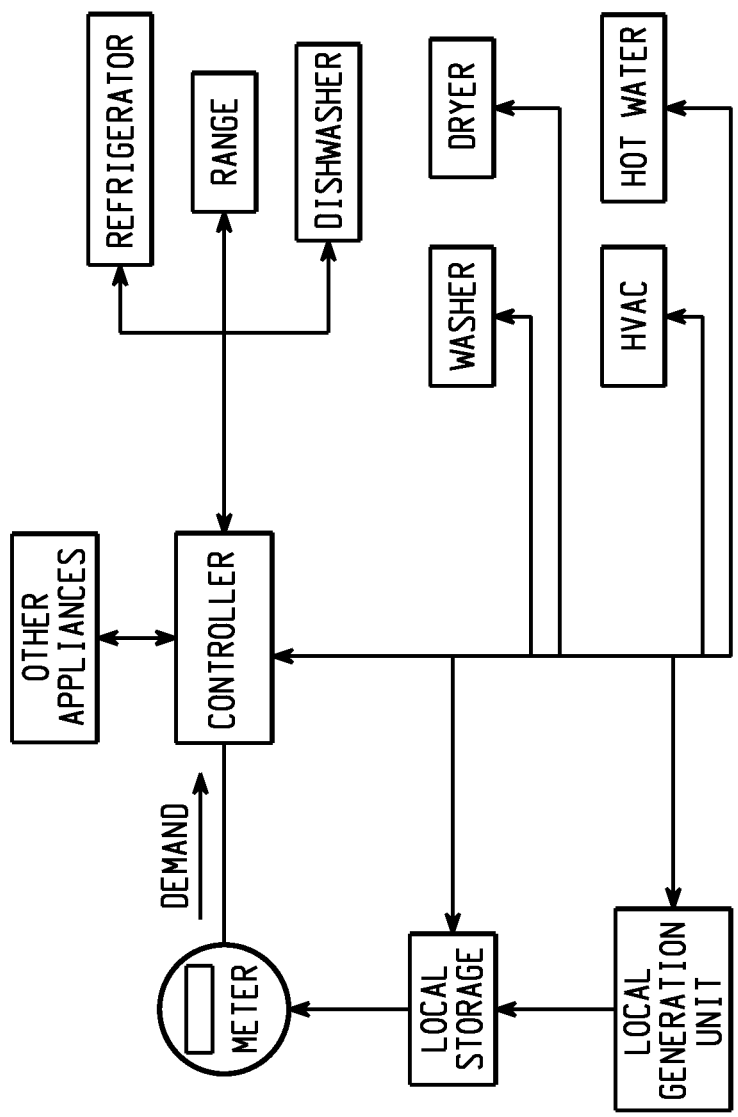
Figure 8:
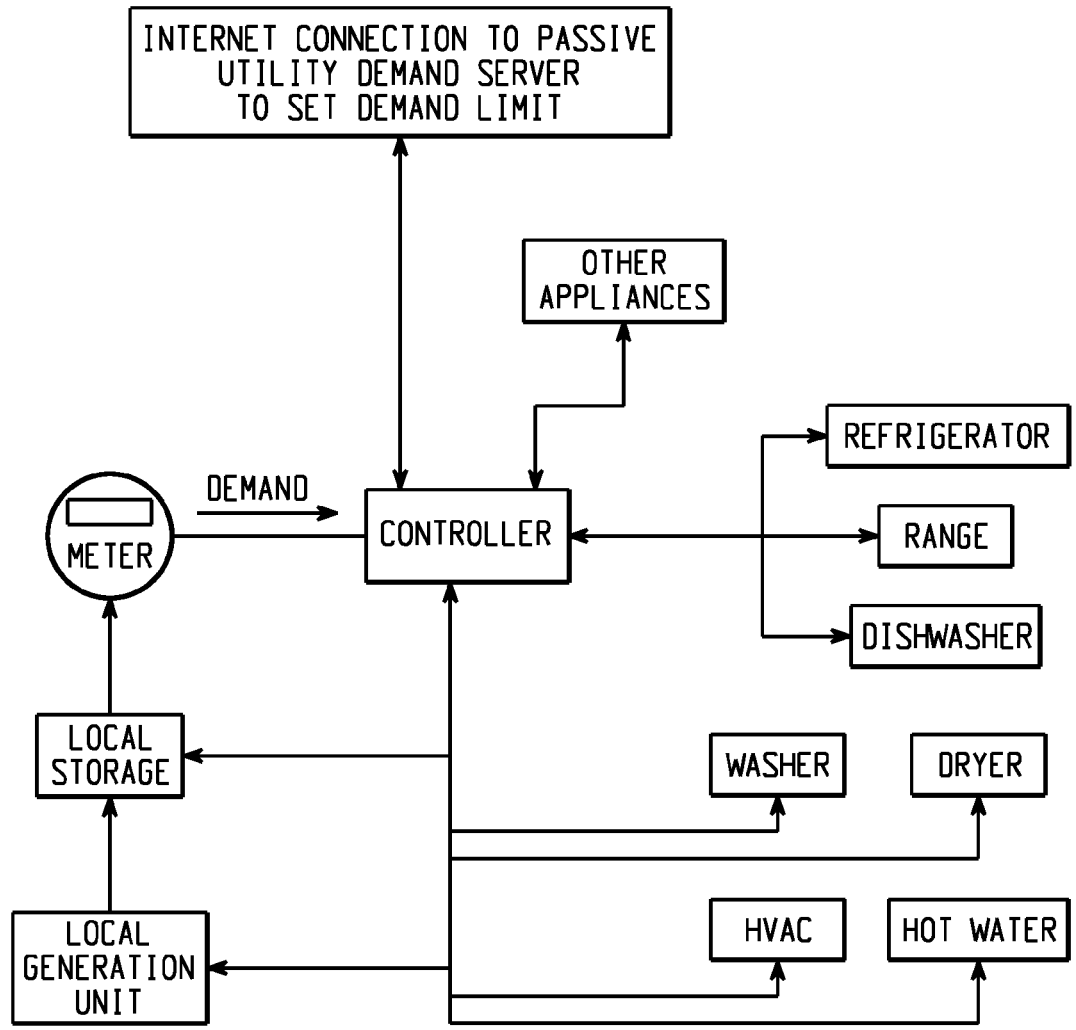

The central controller handles energy management between the utility and home appliances, lighting, thermostat/HVAC, etc. with customer choices incorporated in the decision making process. The controller may include notification of an energy saving mode based on demand limit read from one or more of a utility meter, utility, demand server or user. An energy savings mode of an appliance can thereby be controlled or regulated based on priority and energy need level sent from the controller and/or the customer (FIG. 6). Likewise, consideration to use of local energy storage and use of a local generator to offset peak demand limit can be incorporated into the energy management considerations, or provide the ability to override mode of energy savings through the controller or at the appliance, lighting, or thermostat/HVAC (FIGS. 7 and 8).

The present disclosure has the ability for the home to shed loads in pending brown-out or black-out situations, yet have intelligence to prevent an improper action such as shutting down the refrigerator for extended timeframes that might compromise food storage safety.

How much energy the appliance consumes in peak demand is based on priority of the device and the energy need level. If the appliance's priority is high, then the appliance will most likely not go into a saving mode. The energy need level is based on how little energy the appliance can consume during peak demand and still provide the function setting it is in (i.e. in a refrigerator, ensuring that the temperature is cool enough to prevent spoiling). It will also be appreciated that an appliance may have multiple energy need levels.

The controller will be the main product with the communication and settings control incorporated within future appliances. Specific meters will be selected so that the controller can read the demand usage. It is intended that the demand server will possibly be purchased or leased to the utility.

A method is provided for constructing an appliance designed to perform any key function, the appliance comprises of several mechanical and electrical elements controlled by a main controller. This main controller has a port for receiving information regarding the operational state of the appliance. The port also has a user interface or switch which could be used to override the information received by the controller through the port. Two-way or one-way communication devices may be connected to the port. These communication devices will receive signals from a remote controller, process those signals and as a result communicate an operational state to the main controller of the appliance. This operational state is communicated to the main controller by one or more remote controllers in a specific format determined by the appliance. These signals from the remote controller(s) could be based on a variety of communication methods and associated protocols. On receiving the operational state signal, the appliance main controller causes the appliance to run a predetermined operational mode. These operational modes are designed into the appliance(s) and result in different resource consumption levels or patterns, even delaying use. Resources could include energy, water, air, heat, sunlight, time, etc. In future appliance models, the consumer might be given the authority to modify the appliance responses to a given rate signal. The consumer would be presented a "check box" of potential response modes and allowed to choose within set parameters. For instance, the consumer might be allowed to choose the amount of temperature adjustment a refrigerator will make in response to a high utility rate.

A method of communicating data between a master device and one or more slave devices may advantageously use continuous tone-coded transmission system. This can be a number of states or signals, either using one or more continuous tones that signify different rate states coming from the home area network (from meter) or the utility. Additionally, one could send a combination of tones to transmit binary messages using a few tones. The slave devices will incorporate a receiver that receives the carrier frequency and then decodes the continuous tone which corresponds to the particular state of the utility rate. Once the "receiver board" detects the tone, then the downstream circuitry will trigger the appropriate response in the appliance. The carrier frequency in this scheme can be numerous spectrums, one being the FM broadcast band or a specific FM band allocated by the FCC for low level power output. The advantage of broadcast band FM is the low cost of such devices and the potential to penetrate walls, etc. within a home with very low levels of power due to the long wavelength of the 89-106 Mhz carrier. This process is used today in 2-way radio communications to reduce the annoyance of listening to multiple users on shared 2-way radio frequencies. The process in these radios is referred to as CTCSS (continuous tone-coded squelch system) and would find application in this end use.

Generally, it is not known to have modular interfaces that can receive signals from a control source. Also, no prior arrangements have functioned by addressing the control board of the appliance with a signal that directs the appliance to respond.

Thus, by way of example only, the structure and/or operation of a refrigerator (FIG. 9, although other appliances are also represented) may be modified or altered by reducing the temperature, especially in the freezer compartment pre on-peak time and further temporarily provide a compartment temperature increase to shave on-peak load. Specifically, defrost operation could be delayed until off-peak time. Alternatively or conjunctively, the freezer and refrigerator temperature setpoints may be set to maintain less compressor on time during on-peak demand times. Similarly, the refrigerator/freezer could be programmed so that lights will not be permitted to come on or the lights must be dimmed lights during on-peak demand times. During on-peak demand times, the fan operating speeds can be reduced, and/or compressor operating speed reduced in order to reduce energy consumption. Still another option is to reduce the delay time for the door alarm to sound during on-peak time. Other power load reducing measures in a refrigerator may include (reducing before on-peak hours) the temperature of the freezer and refrigerator compartments in a refrigerator (prechill) and slightly increase temperature setting during on-peak rates. For example, just before peak rate time, the temperature setting could be decreased by 1-2 degrees (during off-peak rates). Some communication line with the electrical company could be established. Thus, the electrical company may be able to send a signal in advance to prechill the refrigerator (or in the case of an air conditioner, decrease the room temperature during off-peak rates as a pre-chill maneuver) and, in turn, increase the temperature setting during on-peak rates.

Figure 12:
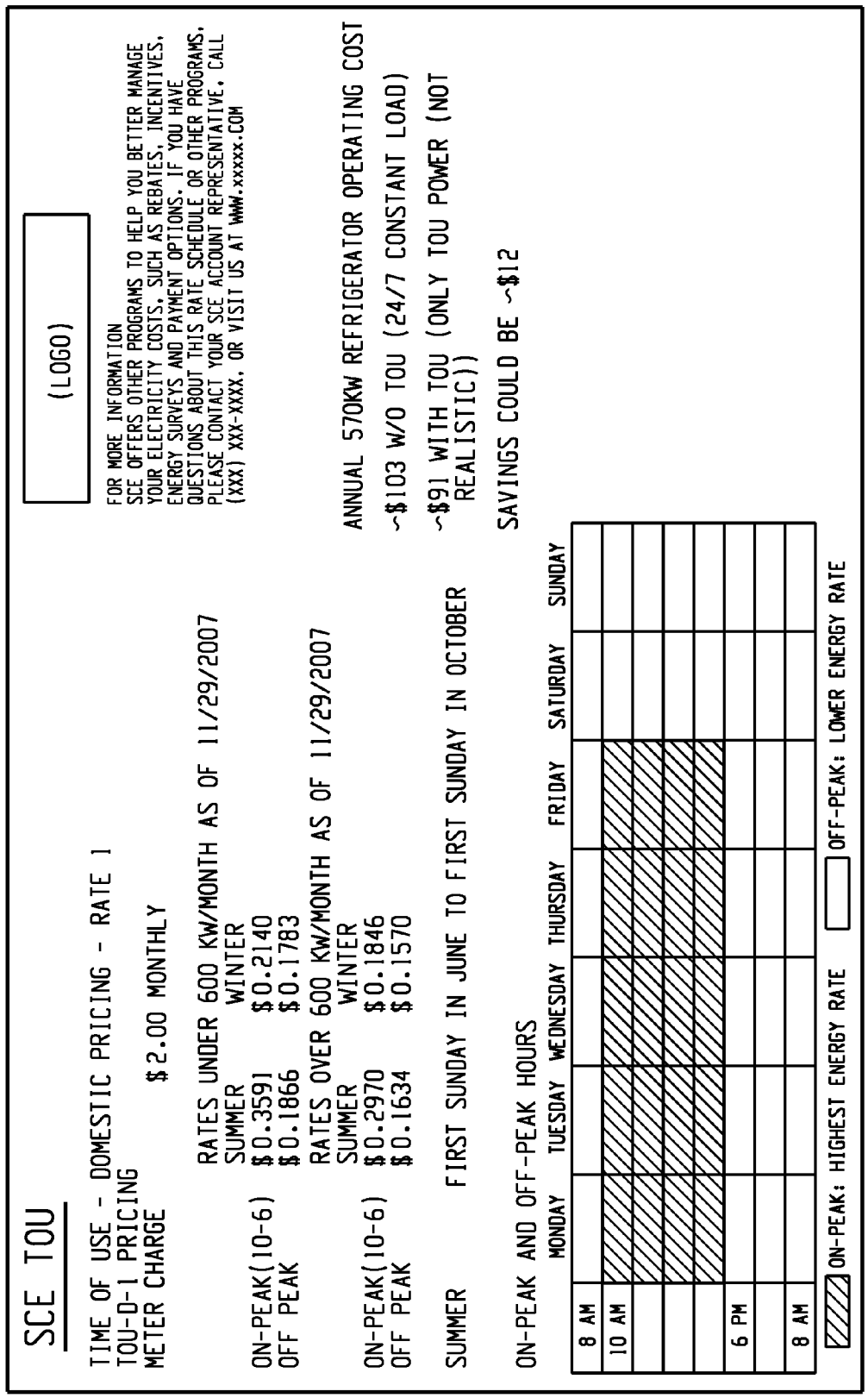
Figure 14:
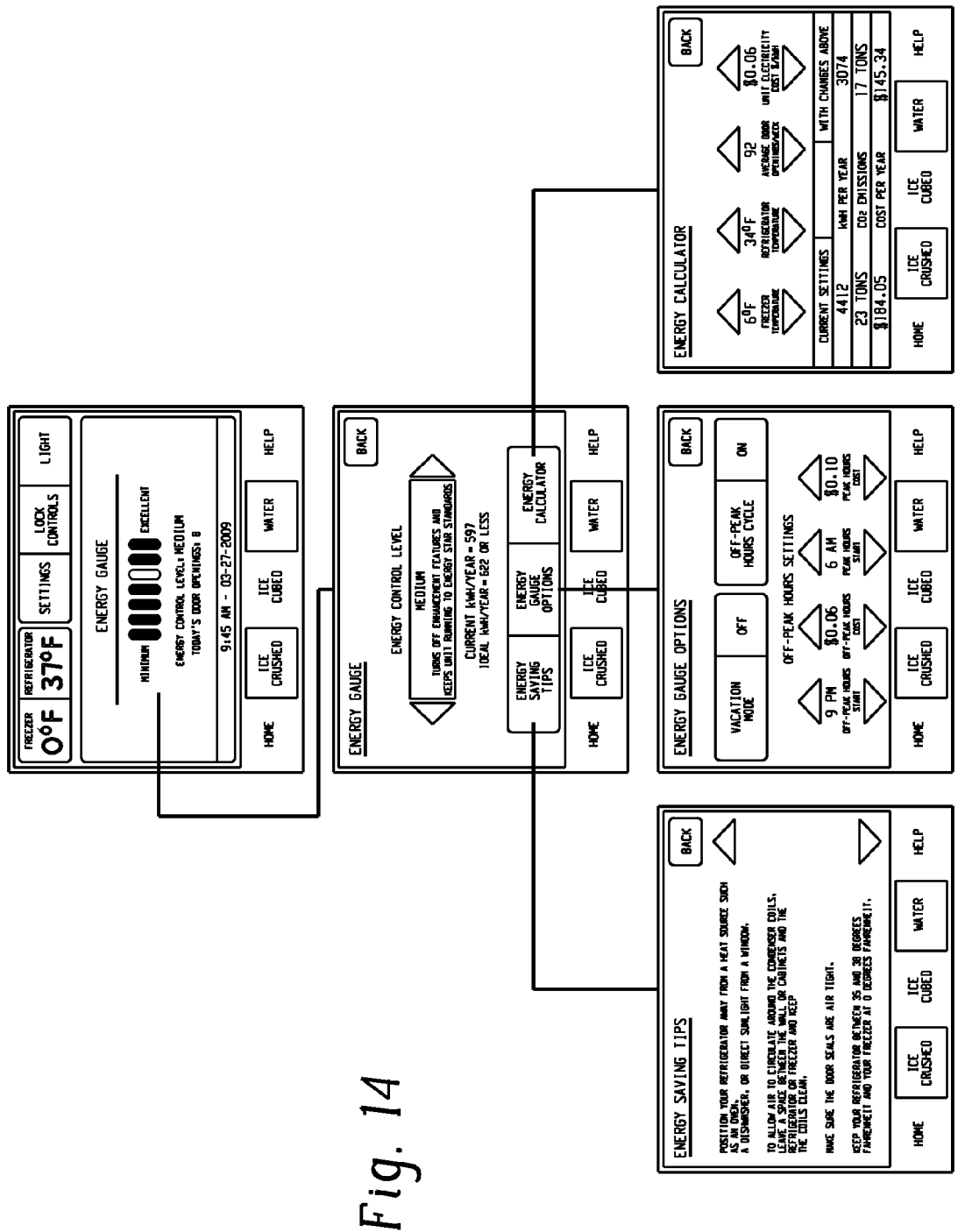
Figure 15:
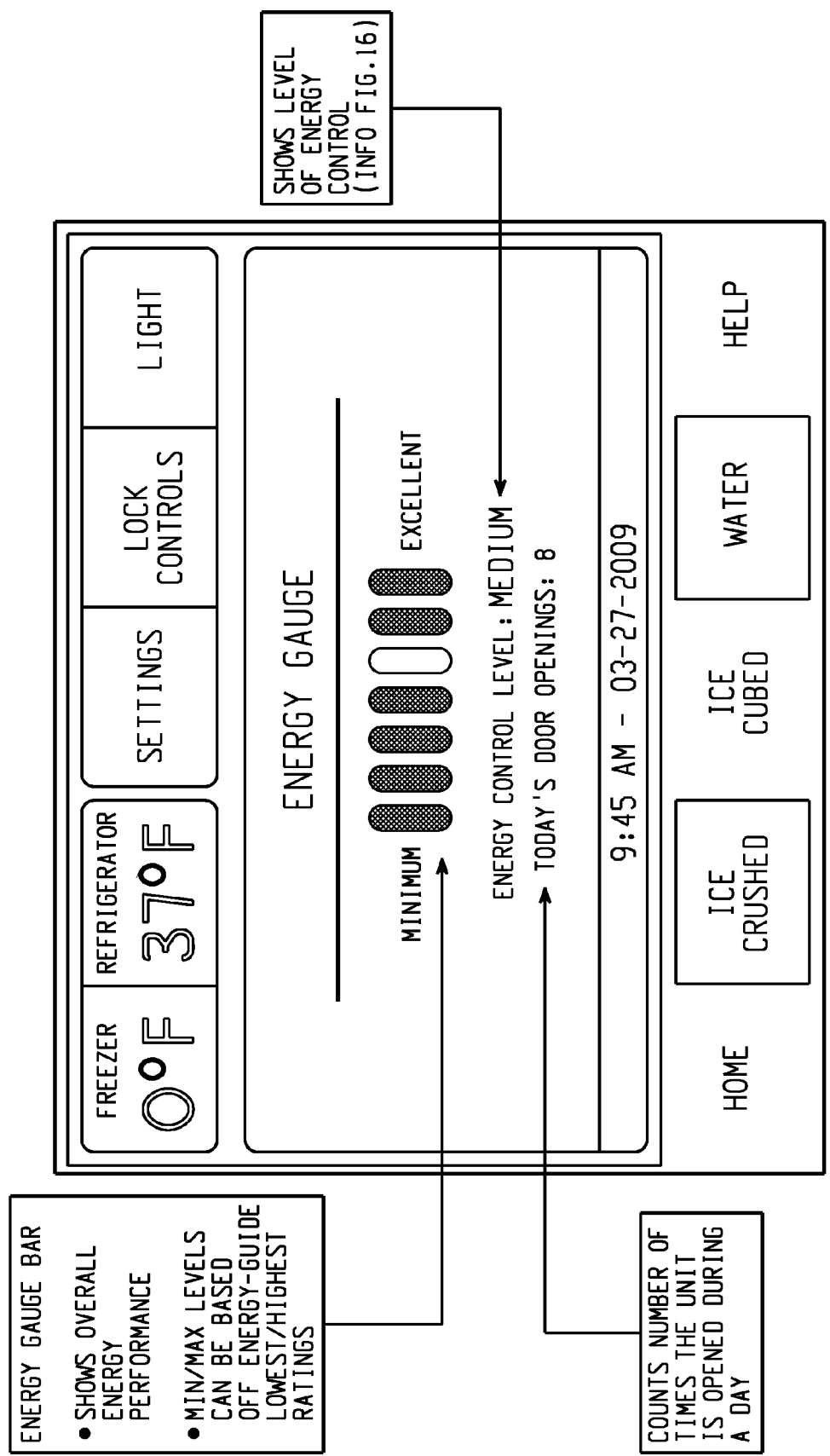
Figure 16:
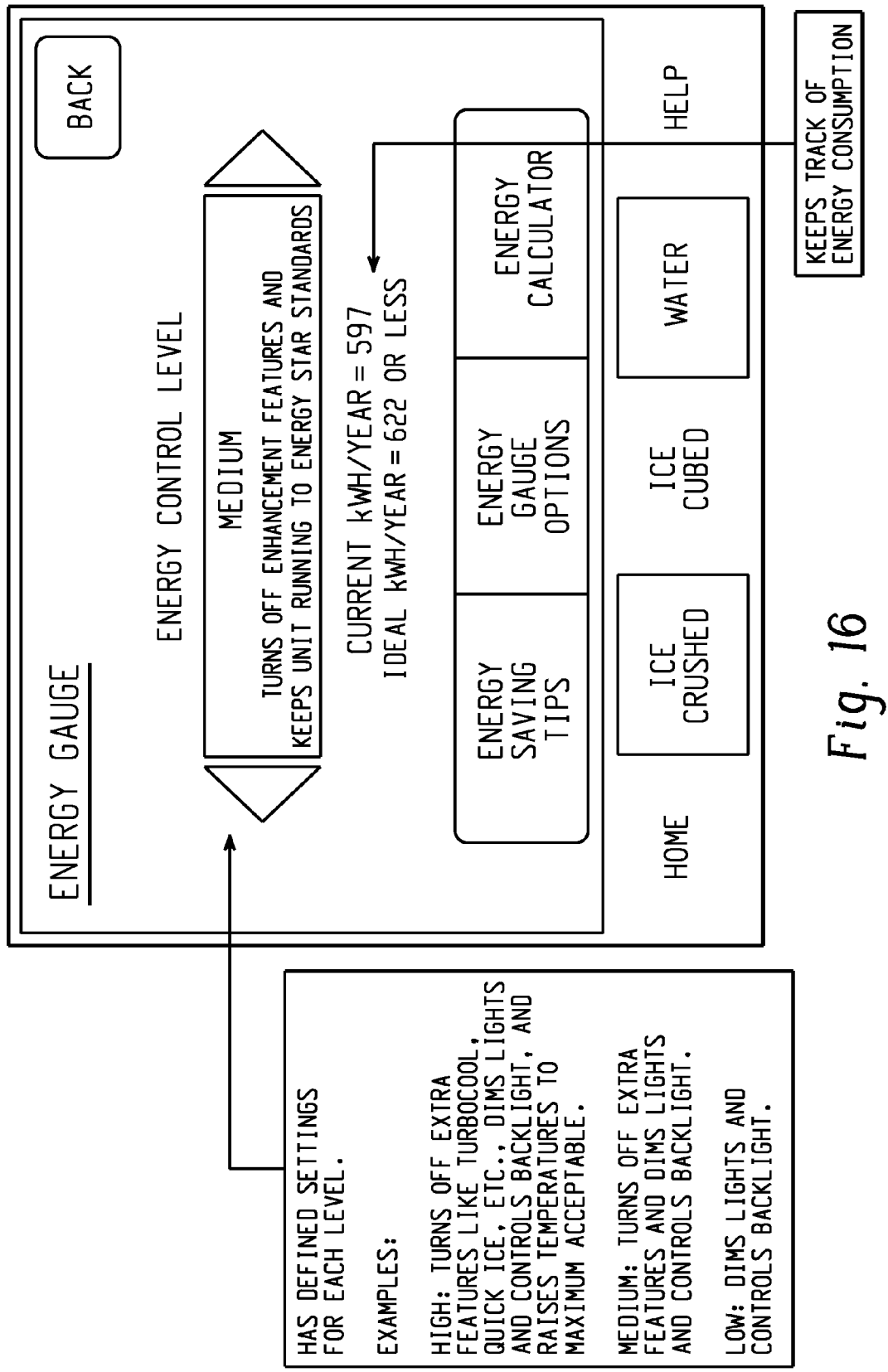
Figure 17:
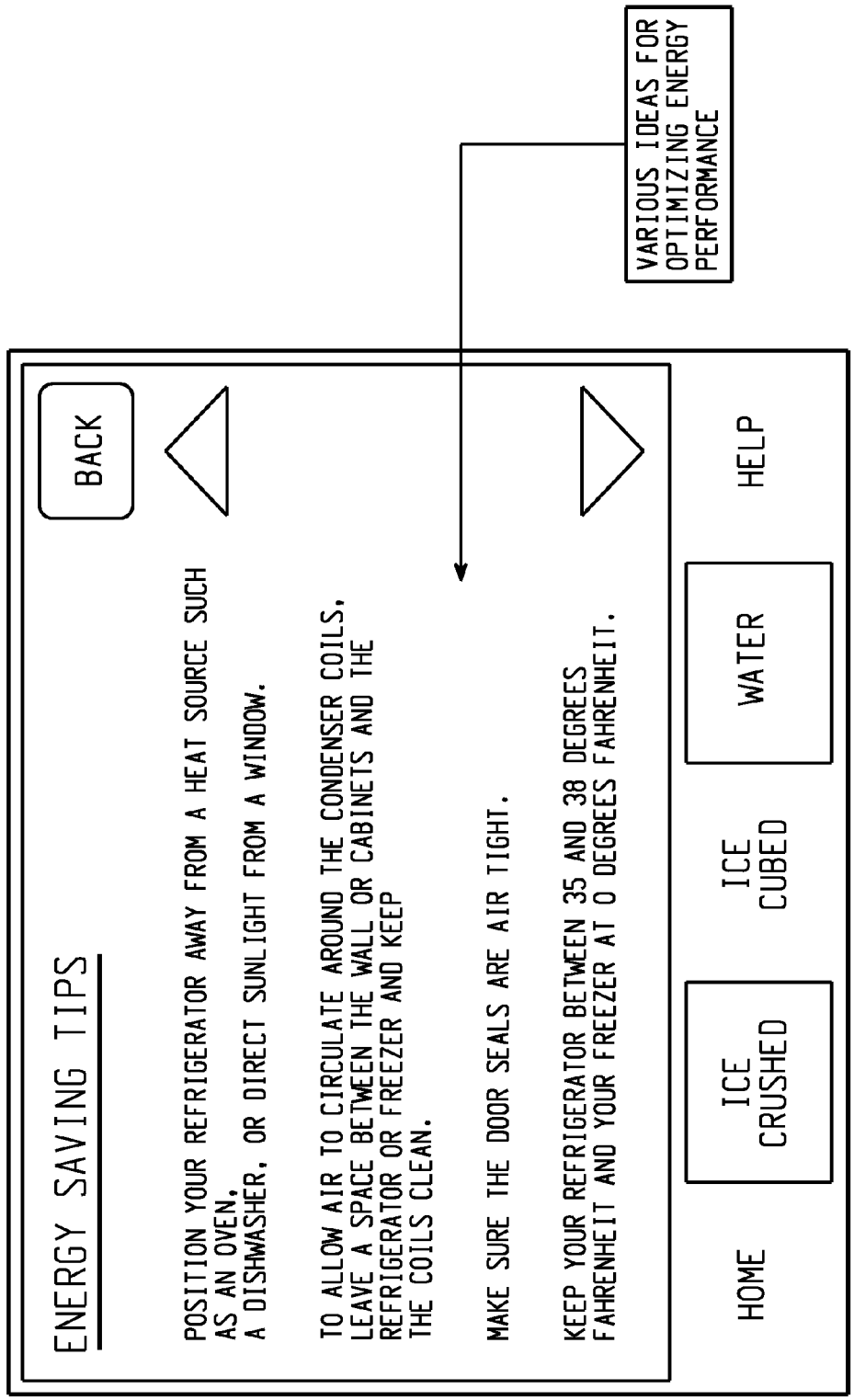
Figure 18:
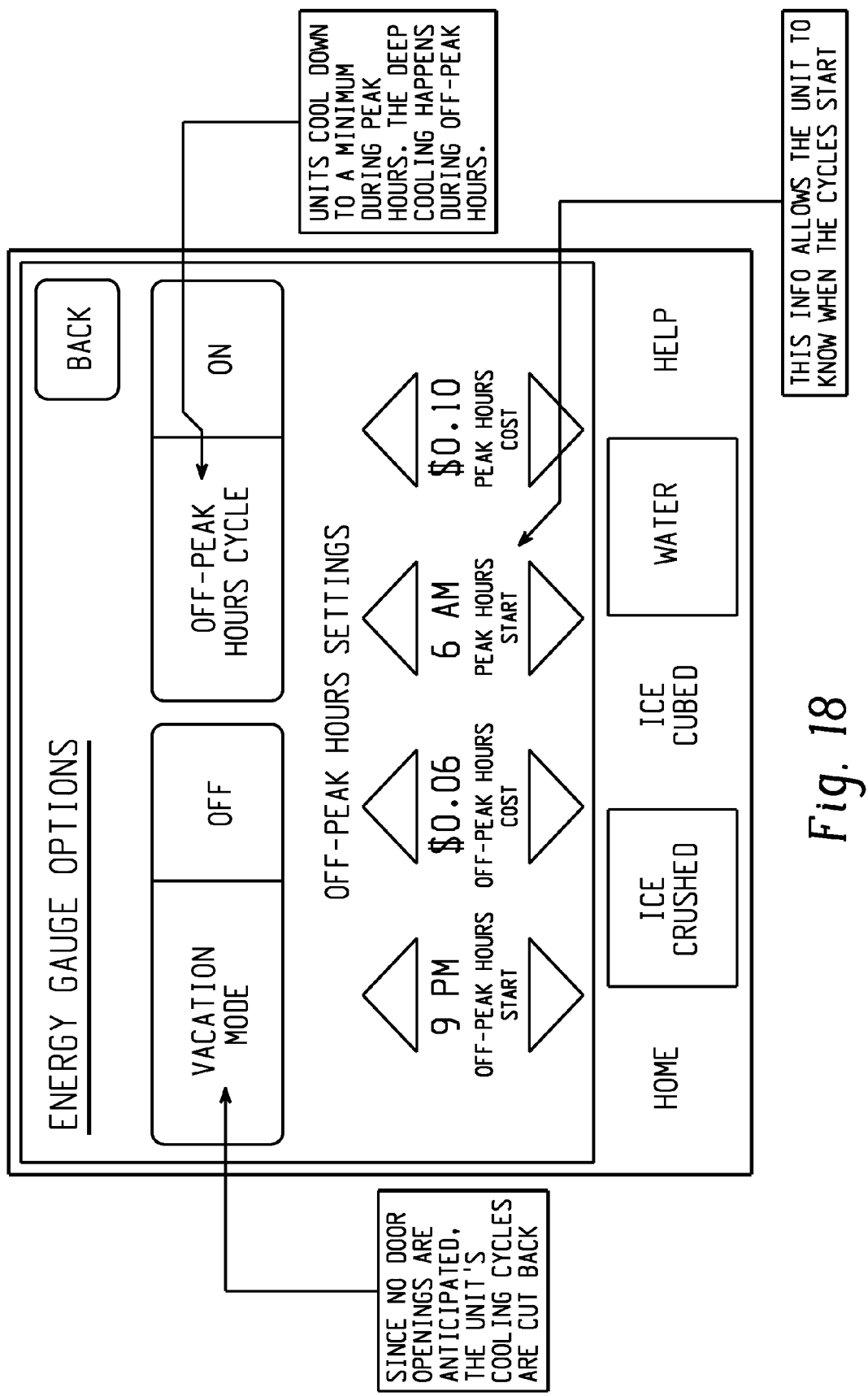
Figure 19:
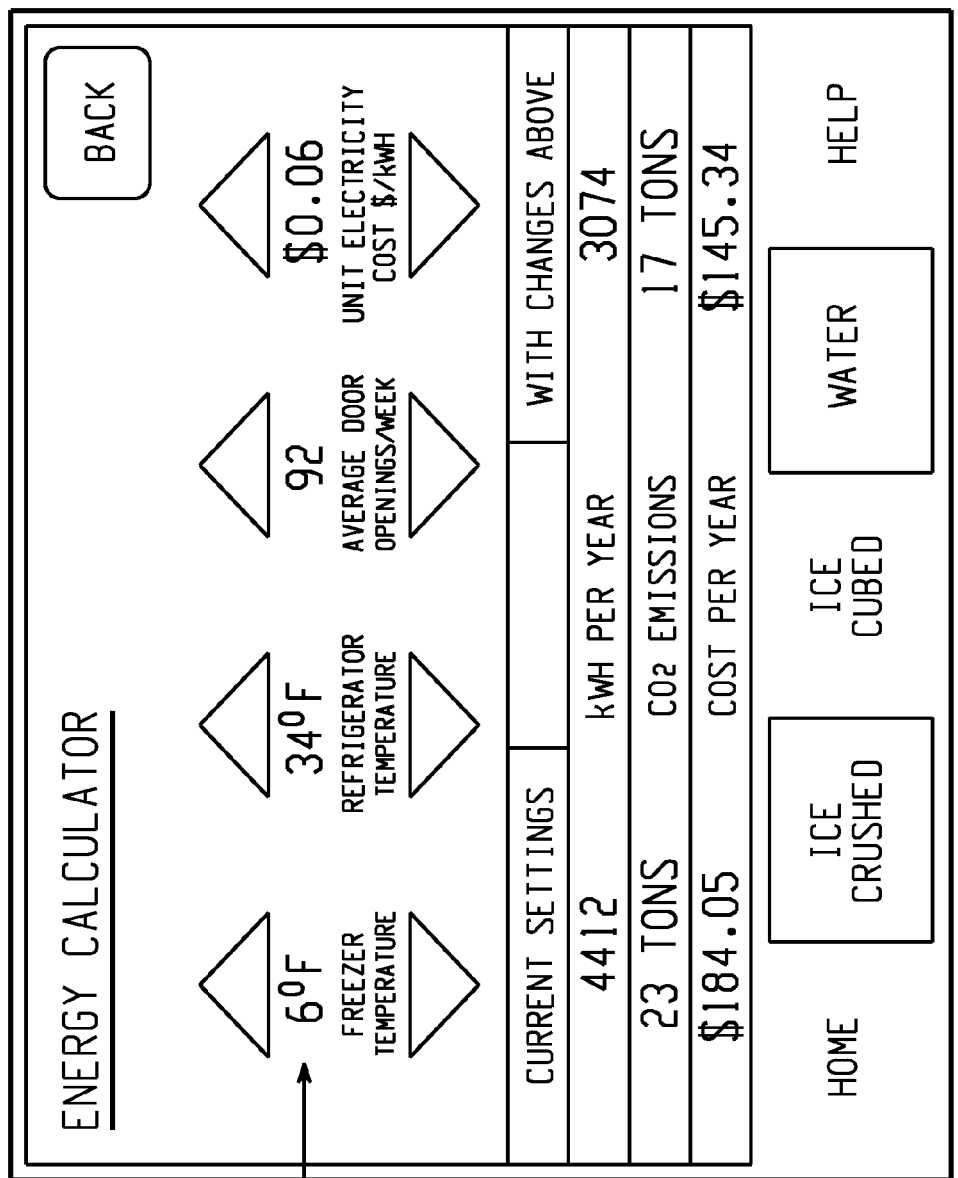

Still other energy consuming practices of the exemplary refrigerator that may be altered include turning the ice-maker off during on-peak demand times, or disabling the crushed ice mode during on-peak demand times. Alternatively, the consumer may be given the ability to select via a user interface which items are incorporated into the on-peak demand via an enable/disable menu, or to provide input selection such as entry of a zip code (FIG. 10) in order to select the utility company and time of use schedule (FIG. 11), or using a time versus day of the week schedule input method (FIGS. 12-13).

The user interface may also incorporate suggested energy saving tips or show energy usage, or provide an indicator during on-peak mode, or provide a counter to illustrate the energy impact of door opening, or showing an energy calculator to the consumer to serve as a reminder of the impact of certain selections/actions on energy use or energy conservation (FIGS. 14-19).

One path that is being pursued from the appliance perspective is to allow the onboard CPU (microprocessor) of the appliance to determine how to respond to an incoming signal asking for a load shedding response. For example, the CPU will turn on, turn off, throttle, delay, adjust, or modify specific functions and features in the appliance to provide a turndown in power consumption (FIG. 20). FIG. 21 defines specifically exemplary modes of what are possible. The main feature here is the enabling of the main board microprocessor or CPU to execute actions in the appliance to deliver load shedding (lowering power consumption at that instant). The actions available in each appliance are only limited to the devices that the CPU has control over, which are nearly all of the electrical consuming devices in an appliance. This may work better where the appliance has an electronic control versus an electromechanical control.

Of course, the above description focuses on the refrigerator but these concepts are equally applicable to other home appliances such as dishwashers, water heaters, washing machines, clothes dryers, televisions (activate a recording feature rather than turning on the television), etc., and the list is simply representative and not intended to be all encompassing.

Likewise, although these concepts have been described with respect to appliances, they may find application in areas other than appliances and other than electricity usage. For example, a controller that acts as an intermediary between the utilities meter and the appliance interprets the utility signal, processes it and then submits this signal to the appliance for the prescribed reaction. In a similar fashion, the controller may find application to other household utilities, for example, natural gas and water within the home. One can equip the water and gas meters to measure flow rates and then drive responses to a gas water heater or gas furnace precisely like the electrical case. This would assume that one might experience variable gas and water rates in the future. Secondly, the flow meters being connected to the controller could provide a consumer with a warning as to broken or leaking water lines by comparing the flow rate when a given appliance or appliances are on to the normal consumption. In cases where safety is a concern, the system could stop the flow of gas or water based on the data analysis.

Another feature might be the incorporation of "remote subscription" for the utility benefit. In some cases, the utility will be providing customers discounts/rebates for subscribing to DSM in their appliances, hot water heaters, etc. The "remote subscription" feature would allow the utility to send a signal that would "lockout" the consumer from disabling the feature since they were on the "rebate" program.

Another feature that the controller lends itself to is the inclusion of "Remote diagnostics". This feature would allow the appliance to send a signal or message to the controller indicating that something in the appliance was not up to specifications. The controller could then relay this signal to the utility or to the appliance manufacturer via the various communication avenues included into the controller (i.e., WIFI, WIMAX, Broadband, cell phone, or any other formats that the controller could "speak").

In the case of a remote subscription, the utilities today rely on the honesty of their subscribers to leave the DSM system functional. Some people may receive the discounts/rebate and then disable the feature that drives the load shedding. With this system, the utility can ensure that the feature will be enabled and provide the proper load shedding.

Figure 22:
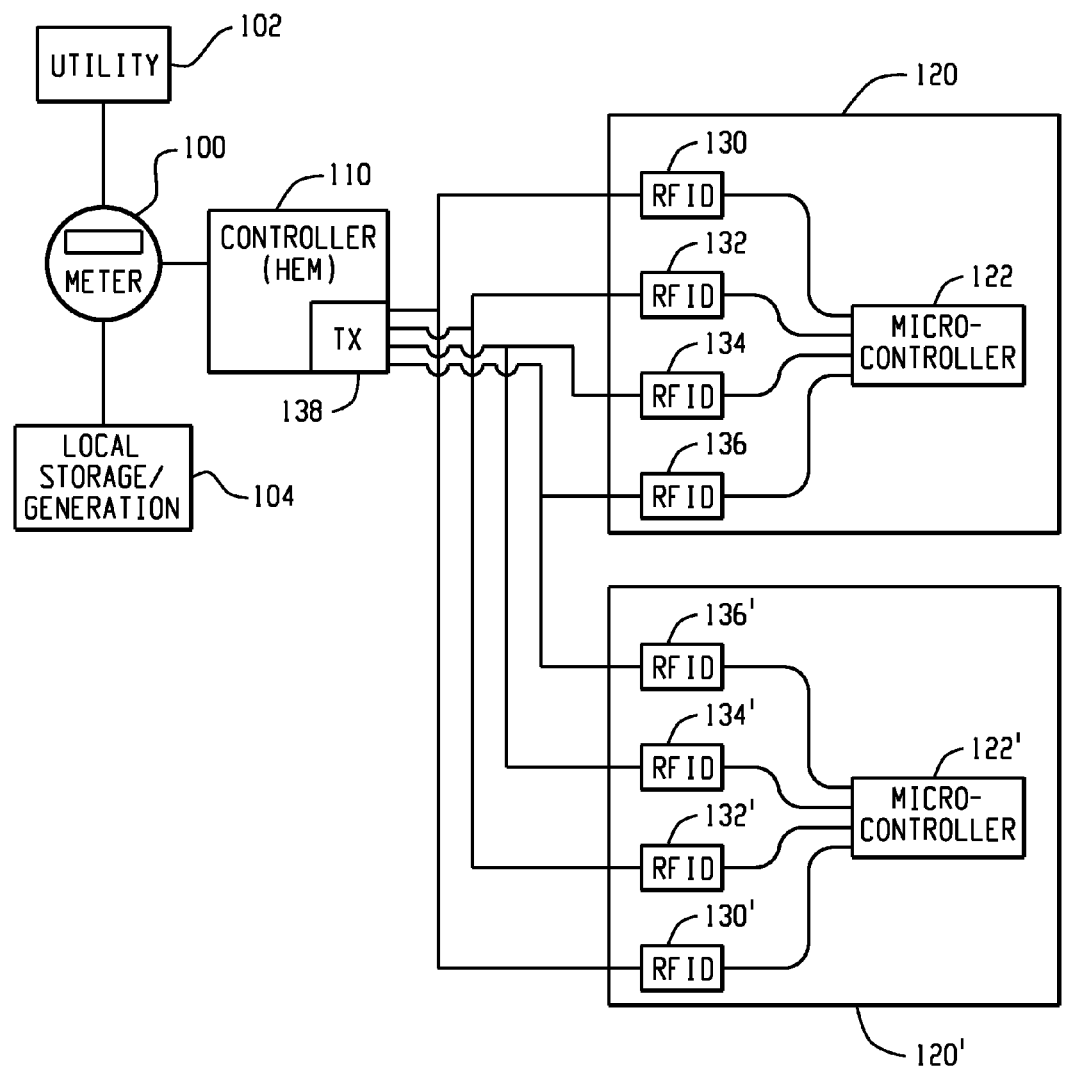
FIGS. 22-24 schematically show an exemplary embodiment of an RFID communication system.
Figure 23:
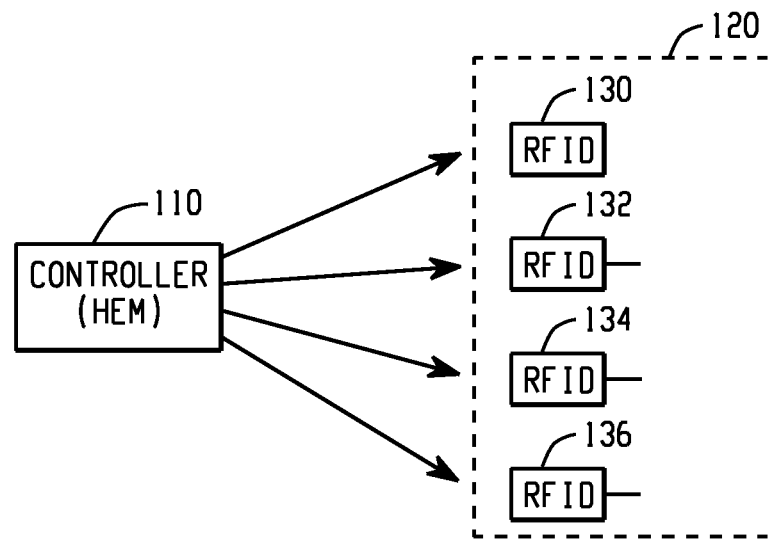
Figure 24:
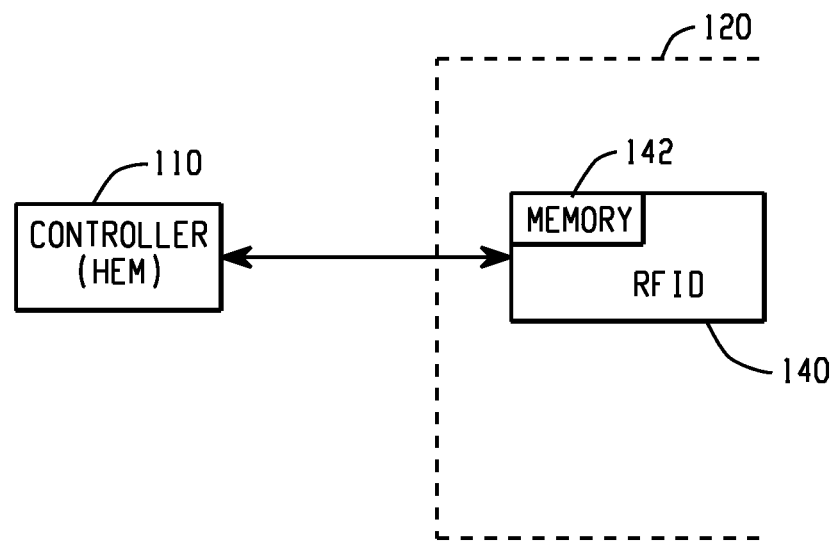

With continued reference to FIGS. 1-21, attention is now directed to FIGS. 22-24 which show more particular details of a system and method of communicating data between a master device and one or more slave devices using RFID technology. Specifically, meter 100 is provided at the home and operatively associated with either utility or local storage/generator 102, 104, respectively, or both. As described previously, the utility may issue a signal to the meter indicative of the cost of energy. This information is transmitted to a controller, such as a home energy controller or home energy module (HEM) 110, that can be located adjacent the meter, or within the home. One or more home appliances 120 each include a microcontroller 122 that operatively controls the individual home appliance. The communication between the master device (controller 110) and one or more slave devices (microcontrollers 122) controls operation of each of a respective home appliance 120. Particularly, at least one RFID tag 130, and as will become more apparent below, second, third, and fourth RFID tags 132, 134, 136, respectively, each communicate with a respective microcontroller of a home appliance. Thus, as seen in FIG. 22, a single controller/HEM communicates with multiple home appliances 120. An emitter 138 is part of the controller/HEM 110, and emits one or more distinct frequency signals indicative of the operational energy costs associated with data received from the utility or other device.

In the embodiment illustrated in FIGS. 22 and 23, any one home appliance 120, 120', etc. includes multiple RFID tags. Four individual RFID tags 130, 132, 134, 136 are shown for each appliance. Each tag communicates with the associated microcontroller of that appliance and resonates in response to a particular frequency emitted by the transmitter or transceiver that has a variable frequency oscillator. Thus, the transmitter 138 emits a select frequency. At the selected frequency, one of the RFID tags is responsive, i.e., resonates. This is indicative of a first state, level 1, 2, 3, or 4 such as "low", "medium", "high", "critical", and representing, for example, operational costs associated with the energy source. Since the RFID tag 130 responds to a first frequency, the microcontroller 122 then provides the opportunity for the associated home appliance to operate in a predetermined manner, for example, associated with a low operational cost mode. Likewise, if the transmitter 138 is changed to a different, second frequency, then the second RFID tags 132, 132', etc. associated with respective home appliances 120, 120', etc. are informed that a different operational cost structure is active and the consumer has the opportunity to accept or reject a programmed operation of the home appliance. Thus, in a one-way operation, each of the RFID tags 130-136 is preferably a passive RFID tag, i.e., a tag that includes an integrated circuit and antenna responsive to a select frequency.

There is typically enough separation between the preselected frequencies that only one RFID tag is resonating at any one time. Binary digits can also be assigned to the RFID tags, and in this way can easily communicate with the microcontroller via the assigned binary digits. For example, the first RFID tag 130 may be representative of a binary "zero" [00]. Similarly, the second RFID 132 tag is a binary "one" [01], the third RFID tag 134 is a binary "two" [10], and the fourth RFID tag 136 is a binary "three" [11]. Required power for the passive RFID tag is very low, and it is also understood that the RFID communication technology has only a limited range so that communication between adjacent homes in the neighborhood is unlikely to occur. It will also be understood that even if there was some bleed-over from one home to another, it is likely that most homes in a sub-division will be receiving the same state of operation or costs, since the homes are likely associated with the same utility. Moreover, each home has the option to accept how to respond at these various levels so that one neighbor that receives a level "three" [11] communication may have the HEM pre-programmed to "always accept" the suggested action for the appliance(s), while a second consumer may opt for "let consumer make decision" when a level "three" [11] is encountered. Thus, it is evident that a particular consumer can make the decisions on how one or more appliances may respond to a particular signal.

It is also contemplated that two-way communication between the RFID tag and the transmitter may occur. Use of an active RFID provides limited power in the RFID tag. That is, it is possible to change the state of the memory 142 associated with an active RFID tag 140 (FIG. 24). In this manner, the transmitter can have a bit that is changed as a result of receiving a signal from the active tag, and thereby know what the state of the appliance is. It is expected that the power for an active RFID tag will come from the appliance main board. By changing a bit in the transmitter in response to the signal emitted by the active tag, the consumer/utility can determine the state of the appliance. Since the controller/home energy manager has a receiver that communicates with the utility, the output side of the home energy manager is a preferred use of this type of communication.

Each RFID tag is relatively inexpensive, on the order of five to ten cents per passive RFID tag and provides an inexpensive, open protocol manner to communicate between the controller/HEM and respective home appliances. The RFID communication system is also advantageous in that the communications can penetrate walls, and is easily implemented. Although the representative example describes the controller/HEM as the transmitter, it is also understood that the transmitter can be located at the meter.

In summary, the enabled appliances can receive signals from the utility meter and help lower the peak load on the utility, and likewise, lower the amount of energy that the consumer uses during high energy cost periods of the day. The RFID system is an effective wireless communication where one or more signals can be transmitted from the master device to one or more slave devices through a low-cost, open protocol. The simple hardware and software, i.e., no protocol, are desirable since transmission is a simple pulse of energy on a particular frequency.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method comprising:
    emitting a first signal and a second signal from a master device in response to data indicative of energy operational costs, the first signal and the second signal having, respectively, a first frequency and a second frequency, wherein the first frequency is different from the second frequency; and
    receiving the first signal and the second signal at a home appliance incorporating a first RFID tag and a second RFID tag responsive to, respectively, the first frequency of the first signal and the second frequency of the second signal to control operation of the home appliance.

2. The method of claim 1, wherein one of the first RFID tag and the second RFID tags are an active RFID tag having a memory for storing data therein.

3. The method of claim 2 further comprising selectively manipulating the data in the active RFID tag by the master device.

4. The method of claim 1, further comprising providing a third RFID tag and a fourth RFID tag in communication with the associated home appliance controller, wherein the third RFID tag and the fourth RFID tag resonate at frequencies that are different from each other and from the first RFID tag and the second RFID tag.

5. The method of claim 4, further comprising emitting a third signal and a fourth signal from the master device at, respectively, a third frequency and a fourth frequency for communicating with the third RFID tag and the fourth RFID tags, respectively.

6. The method of claim 5 wherein the first RFID tag, the second RFID tag, the third RFID tag, and the fourth RFID tag are passive tags and wherein the first signal, the second signal, the third signal, and the fourth signal are representative of low, medium, high, and critical modes of operation for the associated home appliance.

7. A system comprising:
    a master device adapted to receive data relating to energy cost and for emitting a first signal at a first frequency and a second signal at a second frequency indicative of same;
    a home appliance incorporating a first RFID tag and a second RFID tag responsive to, respectively, the first frequency of the first signal and the second frequency of the second signal to control operation of the home appliance from the master device, the appliance also comprising a microcontroller,
    wherein the microcontroller changes operation of the home appliance between a first state and a second state in accordance with the response to the first signal by the first RFID tag and the response to the second signal by the second RFID device.

8. The system of claim 7, wherein one of the first RFID tag and the second RFID tag is an active tag having a memory that is selectively altered in response to the first signal and the second signal from the master device.

9. The system of claim 7, wherein the second RFID tag comprises a passive device operatively associated with the microcontroller.

10. The system of claim 7, further comprising a third RFID tag and a fourth RFID tag operatively associated with the microcontroller, wherein the third RFID tag and the fourth RFID tag are responsive to a third signal at a third frequency and a fourth signal at a fourth frequency from the master device, wherein the microcontroller changes operation of the home appliance between a third state and a fourth state in accordance with the response to the third signal by the third RFID tag and the fourth signal by the fourth RFID tag.

11. The system of claim 10, wherein the first state, the second state, the third state, and the fourth state represent one of low, medium, high and critical modes of operation for the home appliance.

12. The system of claim 9, wherein the first frequency, the second frequency, the third frequency, and the fourth frequency are different from one another.

13. The system of claim 9, wherein the first state and second state define operation of the home appliance in different energy saving operational modes.

* * * * *